US010967279B2

(12) United States Patent
Millecam et al.

(10) Patent No.: US 10,967,279 B2
(45) Date of Patent: Apr. 6, 2021

(54) SYSTEM FOR CREATING AN ENVIRONMENT

(71) Applicant: BATTLEKART EUROPE, Dottignies (BE)

(72) Inventors: Sébastien Millecam, Dottignies (BE); Ludovic Lucas, Havré (BE)

(73) Assignee: BATTLEKART EUROPE, Mouscron (BE)

( * ) Notice: Subject to any disclaimer, the term of this patent is extended or adjusted under 35 U.S.C. 154(b) by 91 days.

(21) Appl. No.: 15/579,992

(22) PCT Filed: Jun. 8, 2015

(86) PCT No.: PCT/EP2015/062731
§ 371 (c)(1),
(2) Date: Dec. 6, 2017

(87) PCT Pub. No.: WO2016/198090
PCT Pub. Date: Dec. 15, 2016

(65) Prior Publication Data
US 2018/0169530 A1 Jun. 21, 2018

(51) Int. Cl.
*A63F 13/803* (2014.01)
*G09B 9/04* (2006.01)
(Continued)

(52) U.S. Cl.
CPC .......... *A63F 13/803* (2014.09); *A63F 13/837* (2014.09); *G09B 9/04* (2013.01); *H04N 9/3147* (2013.01)

(58) Field of Classification Search
None
See application file for complete search history.

(56) References Cited

U.S. PATENT DOCUMENTS 4,322,080 A * 3/1982 Pennington ........... A63F 9/0252
273/358
5,435,553 A * 7/1995 Arima ...................... A63K 1/00
273/442
(Continued)

FOREIGN PATENT DOCUMENTS

EP 2848895 A1 3/2015
JP 2000262756 A 9/2000
(Continued)

OTHER PUBLICATIONS

Wikipedia, Infrared, Mar. 3, 2014, https://web.archive.org/web/20140303134254/https://en.wikipedia.org/wiki/Infrared, p. 1 (Year: 2014).*

(Continued)

*Primary Examiner* — Tramar Harper
(74) *Attorney, Agent, or Firm* — Daugherty & Del Zoppo Co. LPA

(57) ABSTRACT

The present invention relates to a system for creating an environment. More precisely, the present invention relates to a system for creating an environment that includes a server, at least one mobile element, a projection system that includes a plurality of projectors capable of projecting partial images which form an overall image, and a locating system that includes a plurality of sensors capable of detecting whether the mobile element is within its capture cone. The server determines, as a function of the information that it receives from the mobile element and from the locating system, information to be sent to the mobile element and to the projection system, so as to modify the environment perceived by a pilot of the mobile element and of potential spectators.

13 Claims, 9 Drawing Sheets

US 10,967,279 B2
Page 2

(51) Int. Cl.
*A63F 13/837* (2014.01)
*H04N 9/31* (2006.01)

(56) References Cited

U.S. PATENT DOCUMENTS

| | | | | |
|---|---|---|---|---|
| 6,059,657 | A * | 5/2000 | Oh | A63F 9/143 250/206.1 |
| 6,211,790 | B1 * | 4/2001 | Radomsky | G08B 21/0247 340/573.4 |
| 7,402,964 | B1 * | 7/2008 | Calhoun | A63H 30/04 318/11 |
| 8,639,666 | B2 | 1/2014 | Densham et al. | |
| 8,854,594 | B2 | 10/2014 | Densham et al. | |
| 9,055,226 | B2 | 6/2015 | Densham et al. | |
| 2002/0068991 | A1 * | 6/2002 | Fitzsimmons, Jr. | H04N 21/4126 700/214 |
| 2004/0208602 | A1 * | 10/2004 | Plante | H04B 10/1125 398/140 |
| 2005/0215327 | A1 * | 9/2005 | Weisel, Jr. | A63H 18/02 463/58 |
| 2005/0250416 | A1 * | 11/2005 | Barthold | A63F 1/04 446/465 |
| 2006/0077913 | A1 * | 4/2006 | McDermott | H04B 7/005 370/278 |
| 2008/0191864 | A1 * | 8/2008 | Wolfson | G06F 3/011 340/524 |
| 2008/0259096 | A1 | 10/2008 | Huston | |
| 2009/0075733 | A1 * | 3/2009 | Andersen | A63F 13/02 463/34 |
| 2009/0081923 | A1 * | 3/2009 | Dooley | A63F 9/143 446/456 |
| 2009/0124382 | A1 * | 5/2009 | Lachance | G06F 3/011 463/34 |
| 2009/0209308 | A1 * | 8/2009 | Ciarrocchi | G10H 1/32 463/1 |
| 2010/0035684 | A1 | 2/2010 | Kotlarik et al. | |
| 2010/0062866 | A1 * | 3/2010 | Schnuckle | A63J 1/02 472/78 |
| 2010/0160054 | A1 * | 6/2010 | Henry | A63G 21/18 472/117 |
| 2010/0203933 | A1 * | 8/2010 | Eyzaguirre | A63H 13/10 463/2 |
| 2010/0245233 | A1 | 9/2010 | Hammarling | |
| 2015/0041230 | A1 | 2/2015 | Lefebvre et al. | |
| 2015/0190726 | A1 * | 7/2015 | Frolov | A63G 31/16 472/61 |
| 2015/0209664 | A1 * | 7/2015 | Haseltine | A63F 13/00 463/31 |
| 2015/0336473 | A1 * | 11/2015 | Spelta | B60W 50/085 701/22 |
| 2016/0089610 | A1 * | 3/2016 | Boyle | A63F 13/65 463/7 |
| 2017/0023911 | A1 * | 1/2017 | Russell | G02B 27/2292 |
| 2017/0136378 | A1 * | 5/2017 | Sofman | A63H 17/40 |
| 2017/0166221 | A1 * | 6/2017 | Osterman | A63G 25/00 |
| 2017/0246534 | A1 * | 8/2017 | Johnson | A63F 13/27 |
| 2018/0085663 | A1 * | 3/2018 | Vlasak | A63F 9/24 |

FOREIGN PATENT DOCUMENTS

| | | |
|---|---|---|
| JP | 2006505330 A | 2/2006 |
| JP | 2016091423 A | 5/2016 |
| JP | 2015132846 A1 | 3/2017 |

OTHER PUBLICATIONS

ISA/EP International Search Report dated Nov. 11, 2015 re PCT Application No. PCT/EP2015/062731, filed Jun. 8, 2015.
Brett Jones et al, RoomAlive: Magical Experiences Enabled by Scalable, Adaptive Projector-Camera Units, Oct. 8-11, 2014, 9 pp, entire dcument.
Translation of Korean Patent Office action dated Sep. 27, 2019 issued in application of Battlekart Europe, No. 10-2017-7037300, filed Dec. 26, 2017, for System for Creating an Environment.
English translation of "Paris Match, Wallonia Wins" Monsle coeur du Hainaut (identified as NB1 on Third-Party submission in counterpart foreign application EP15733364 dated Dec. 21, 2019), https://www.idea.be/untoads/presse/cp/22-04/2014-communiaue-denresse.ndf Apr. 22, 2014, All pages.
English translation of "BattleKart EU" (identified as NB2 on Third-Party submission in counterpart foreign application EP15733364 dated Dec. 21, 2019), Web Archive, Battlekart.eu website, https://web-archive.Org/web/changes/http:/www.battlekart.eu/fr/accueil/ 2014, All pages.
English translation of "Aims the Newspaper" Polytech Mons Alumni (identified as NB3 on Third-Party submission in counterpart foreign application EP15733364 dated Dec. 21, 2019), https://polytech-mons-alumni.be/fileadmin/AIMs_redacteurs/Journal/Archives/Journal_Septembre_2013.pdf Sep. 14, 2013, All pages.
English translation of "BattleKart: conception of a simulator for a leisure project" by Sebastien Millecam (identified as NB4 on Third-Party submission in counterpart foreign application EP15733364 dated Dec. 21, 2019), http://biblio.umons.ac/be/webopac/FullBB.csp?WebAction 2012, All pages.
English translation of "BattleKart—Official Trailer—BattleKart Mouscron" (identified as NB5—Facebook pictures on Third-Party submission in counterpart foreign application EP15733364 dated Dec. 21, 2019), https://www.facebook.com/BattleKart/photos/a.739990342685098/743707422313390/?type=3&theater Oct. 9, 2013, All pages.
English translation of "Battlekart: UMons engineers create a life-size Mario Kart," (identified as NB6 on Third-Party submission in counterpart foreign application EP15733364 dated Dec. 21, 2019), dated Jul. 24, 2013, All pages.
English translation of "[Project] BattleKart—Personal and Community Management Topics," (identified as NB7 on Third-Party submission in counterpart foreign application EP15733364 dated Dec. 21, 2019), https://forum.nextinpact.com/topic/168704-projet-battlekart/ Feb. 11, 2014, All pages.
English translation of "Two Graduates of the Umons Invent the Karting of Tomorrow," (identified as NB8 on Third-Party submission in counterpart foreign application EP15733364 dated Dec. 21, 2019), https://sharepoint1.umons.ac.be/FR/actualites/Pages/Battlekart.aspx Aug. 19, 2013, All pages.
English translation of "A real karting project like Mario Kart! Digital" (identified as NB9 on Third-Party submission in counterpart foreign application EP15733364 dated Dec. 21, 2019), Fabien Pionneau, Les Numeriques, https://www.lesnumeriques.com/loisirs/vrai-proj et-karting-facon- mario-kart- n305 61, Dec. 19, 2019, All pages.
English translation of "Young Montois adapt "Mario Kart" to reality" (identified as NB10 Third-Party submission in counterpart foreign application EP15733364 dated Dec. 21, 2019), https://www.rtl.be/info/video/452604.aspx—Vertaal deze pagina Jul. 26, 2013, Young Montois adapt the famous Mario Kart video game to reality by creating a go-cart like no other! Jul. 26, 2013, All pages.
English translation of "BattleKart, Design of a simulator for a new leisure project inspired by a video game" (identified as NB11 on Third-Party submission in counterpart foreign application EP15733364 dated Dec. 21, 2019), Polytech Mon Alumni, AIMs The Newspaper, Dec. 2012, p. 8, All pages.
English translation of "Mons: Two young people create Battlekart," TELEMB (identified as NB12 on Third-Party submission in counterpart foreign application EP15733364 dated Dec. 21, 2019), Jul. 31, 2013, All pages.
English translation of "Amusement vehicle, amusement environment for a vehicle and method of using the same" BattleKart Official Trailer (identified as NB13 on Third-Party submission in counterpart foreign application EP15733364 dated Dec. 21, 2019), YouTube, Oct. 13, 2013, All pages.
English translation of "Battlekarteu—The greatest reward for BattleKart is you" (identified as Link O1 in Third-Party submission in counterpart foreign application EP15733364 dated Dec. 21, 2019),

(56) References Cited

OTHER PUBLICATIONS https://www.battlekart.eu/nl/new/la-plus-belle-recompense-pour-battlekart-c-est-vous, May 30, 2017, All pages.
English translation of "Battlekart: the future karting on video"(Identified as Link 02 in NB-19, Third-Party submission in counterpart foreign application EP15733364 dated Dec. 21, 2019), http://www.gameblog.fr/news/37155-battlekart-le-futur-karting-en-video, Jul. 29, 2013, All pages.
English translation of "Investor Search" Company Summary (identified as Link 03 in Third-Party submission in counterpart foreign application EP15733364 dated Dec. 21, 2019), http://gust.com/companies/battlekart, Feb. 2014, All pages.
English translation of History of the project (identified as Link 07 in Third-Party submission in counterpart foreign application EP15733364 dated Dec. 21, 2019), https://www.ccimag.be/2019/06/05/portrait-sebastien-millecam-realite-faite-etre-depassee, Jun. 5, 2019, All pages.
English translation of "Press Kit—Mouscron: the crazy project of two young entrepeneurs BattleKart, a life-size 'video game' combining karting and augmented reality" (identified as Link 08 in Third-Party submission in counterpart foreign application EP15733364 dated Dec. 21, 2019), http://www.innovatech.be/wp-content/upload/2016/10/DP_Battlekart_v1.pdf), Jul. 10, 2015, All pages.
Third-party Submission in counterpart foreign patent application EP15733364, Dec. 21, 2019, All pages.
Joan Lyman, Cast Brings its Crowd Stopping BLACKTRAX Demo to NAB, Apr. 2, 2012, http://www.ivedesignonline.com/cast-brings-its-crowd-stopping-blacktrax-demo-to-nab, all pages.
Zoe Mutter, BlackTrax brings Marvel Comics closer to its audience, Aug. 18, 2014, https://www.avinteractive.com/news/blacktrax-brings-marvel-comics-closer-audience-super-hero-speeds-18-08-2014/, all pages.
Marvel Universe LIVE! sees disguise push the limits of projection mapping and an exciting integration with BlackTrax, Disguise, 2014, http://www.disguise.one/en/showcases/theatre/marvel-live-universe/, all pages.
Real-time Motion Projection Tracking Key to Creating Superheroes Live, Computer Graphics World, Aug. 14, 2014, http://www.cgw.com/Press-Center/Web-Exclusives/2014/Real-time-Motion-Tracking-Key-to-creating-Superh.aspx, all pages.
Real-time Mapped Projection Tracking Achieved with d3 Media Servers and BlackTrax at Dubai's HbMPSG Awards Ceremony, HDavis, Apr. 8, 2015, http://www.creativeplanetnetwork.com/content/post-type/real-time-mapped-projection-tracking-achieved-d3-media-servers-and-blacktrax-dubais-hbmpsg-awards-ceremony-609312, all pages.
Marvel Universe LIVE!:30 Spot, Marvel Universe Live, Aug. 13, 2014, http://www.youtube.com/watch?v=wSAOLOs2ocA&feature=youtu.be, all pages.
Showcasing BlackTrax at Prolight Show 2012, Cast Software, Mar. 28, 2012, http://www.youtube.com/watch?v=pjEWHlm9i0, all pages.
BlackTrax at Eurovision—Tracking BMX Bikers in realtime, CAST software, Mar. 18, 2014, http://www.youtube.com/watch?v=c36O8R2mohw, all pages.
BlackTrax Accurary Test, Cast Software, Jul. 5, 2013, http://www.youtube.com/watch?v=chlMIKeHANM, all pages.
Observations by third parties regarding the European Patent Application No. 15733364.2, European Patent Office 0-80298 Munich, Germany, Sep. 14, 2020, all pages.

\* cited by examiner

SYSTEM FOR CREATING AN ENVIRONMENT

TECHNICAL FIELD

The present invention relates to a system for creating an environment. More precisely, the present invention relates to a system for creating an environment, wherein a projected image can be modified according to the position of at least one mobile element measured by a locating system.

PRIOR ART

Current karting systems comprise a track marked on the floor and karts which drive on this track.

Unfortunately, the track is materialised on the floor by stationary elements, which take a long time to install and a long time to remove, like paint or stickers. It is therefore not possible to quickly change track in a given place.

Furthermore, karts can collide with each other or with stationary objects.

Furthermore, the karting race is fun but repetitive, and karting in one single kart is barely any fun.

The invention therefore aims to propose a system for creating an environment which enables the implementation of a karting system which has none of these problems.

DISCLOSURE OF THE INVENTION

To this end, the invention proposes a system for creating an environment, the environment comprising at least one image arranged to be visible by at least one pilot of at least one mobile element, the system comprising:
- the at least one mobile element, which itself comprises an electronic interface and at least one actuating means connected to the electronic interface,
- a projection system arranged to project the at least one image,
- a locating system arranged to determine a position of each mobile element present near the at least one image, and
- a server arranged to be connected to the electronic interface of each mobile element, to the locating system and to the projection system, the server being arranged to control the projection system and said at least one actuating means based on the position of each mobile element received from the locating system.

Indeed, the projection system enables an image to be projected, like a karting track image, which is replaceable very quickly. It is therefore very easy to request the server to indicate to the projection system that a new track image must be displayed.

Furthermore, the locating system enables to locate mobile elements which can be karts. Their location is sent to the server which can act on the karts, via their actuating means, to modify their movement and prevent a collision.

Furthermore, the server can indicate to the projection system how to modify the image to adapt it to the position of the karts and can act on the karts, via their actuating means, to modify certain characteristics of it, which makes karting attractive, even for a single player, and makes karting even more attractive when several players are taking part.

Advantageously, the connection between the electronic interface and the server passes through a board computer.

Advantageously, each mobile element further comprises at least one actuator connected to the electronic interface and arranged to be actuated by the pilot of the mobile element, the server being arranged to act on the projection system and on the at least one actuating means, based on an actuation of at least one actuator.

The actuator enables the pilot to give instructions to the mobile element, instructions which can be transferred to the server via the interface and the board computer. This enables the pilot to act on the environment and the server to be aware of the pilot's instructions.

Advantageously, each mobile element further comprises a emitter. The emitter enables an excellent location of the mobile element by the locating system.

Advantageously, the emitter comprises at least one electromagnetic radiation source.

Advantageously, the electromagnetic radiation source comprises an infrared emitter. The location works particularly well with this type of radiation.

Advantageously, each one of the electromagnetic radiation sources comprises a light-emitting diode with a power of between 5 and 50 Watts. The location works particularly well with this type of radiation.

Advantageously, the projection system comprises at least one video stream computer and at least one projector, each video stream computer being connected to the server and each projector being connected to the video stream computer. Such an embodiment of the projection system enables a large part of the necessary calculations to generate the image to be made by video stream computers, which ensures a good distribution of computations, in particular if the projection system comprises a large number of projectors, so that the image covers a large surface.

Advantageously, the projection system comprises a plurality of projectors, each one of the projectors being arranged to project a partial image, such that all the partial images projected by the projectors form the image. This enables an image to be obtained, which covers a large surface, sufficiently lit to be properly perceived by pilots, and wherein the pixels are not too visible.

Advantageously, partial images are covered at least partially. This enables to avoid zones not covered by the image at the edge of the partial images of each one of the projectors.

Advantageously, the locating system comprises at least one microcontroller connected to the server and at least one sensor connected to the microcontroller. The microcontroller, in particular, serves as a relay between the sensor and the server.

Advantageously, a connection between each sensor and the microcontroller to which the sensor is connected uses I²C. Connection by I²C makes the transfer of data from the sensor to the microcontroller quick and reliable.

Advantageously, a connection between each microcontroller and the server uses Ethernet. Connection by Ethernet makes the transfer of data from the microcontroller to the server quick and reliable. Furthermore, Ethernet enables data transfer over long distances. Furthermore, Ethernet enables to transport, via the use of Power over Ethernet (PoE), the electrical supply of the sensors.

Advantageously, each sensor comprises a camera arranged to take an image and capable of detecting infrared radiation. The location works particularly well with this type of radiation.

Advantageously, the sensor further comprises a device for processing data, arranged to increase the resolution of the image taken by the camera.

Advantageously, the system further comprises a system for identifying the sensor, using which the server is capable of identifying the sensor from which information reaches it from among a plurality of sensors. This enables the server to immediately identify the sensor transmitting the information, without even having to read the information in itself.

Advantageously, each sensor is connected to a display system, comprising a plurality of light-emitting diodes, the sensor and the display system to which it is connected being arranged to light up a number of diodes, equal to the number of mobile elements perceived by the sensor. This enables to easily test the sensors and to easily estimate the limits of their capture surface.

Advantageously, the at least one mobile element is a kart and the image comprises a karting track.

The invention further proposes a method for creating an environment, the environment comprising at least one image arranged to be visible by at least one pilot of at least one mobile element, the method comprising a cycle including steps of:
  determining projection information by a server,
  transferring projection information to a projection system,
  projecting the image by the projection system based on the projection information,
  determining characteristic information by the server for each mobile element,
  transferring characteristic information to the corresponding mobile element,
  adapting characteristics of the mobile element based on the characteristic information,
  receiving instructions from a pilot of the mobile element, which makes the mobile element generate information for the server,
  transferring information for the server from the mobile element to the server,
  modifying the position of the mobile element based on the instructions,
  determining the position of the mobile element by the locating system, which generates positional information,
  transferring positional information from the locating system to the server, and
  processing data by the server, including determining projection information and determining characteristic information, based on the information for the server and the positional information.

The method for creating an environment according to the invention, enables the whole environment to be adapted almost instantaneously to the position of the mobile elements and to the instructions from the pilots.

Advantageously, the adaptation of characteristics of the mobile element comprises steps of:
  determining information for an electronic interface carried out by a board computer connected to the server,
  determining signals for actuating means carried out by an electronic interface connected to the board computer, and
  modifying characteristics of actuating means carried out by at least one actuating means connected to the electronic interface.

The electronic interface enables to make the connection between the board computer and the actuating means, in particular if the board computer is only capable of generating digital signals while the actuating means can only be actuated via analogue signals.

Advantageously, the adaptation of characteristics of the mobile element comprises steps of:
  determining information for the dashboard carried out by a board computer connected to the server, and
  modifying the display carried out by a dashboard connected to the board computer.

The dashboard enables to display information, in particular coming from the server, likely to affect the pilot.

Advantageously, the projection of the image by the projection system comprises steps of:
  determining video streams carried out by at least one video stream computer connected to the server, and
  projecting an image carried out by at least one projector connected to the at least one video stream computer.

The fact that the video stream is determined by video stream computers enables to distribute its calculation between different calculation devices.

Advantageously, determining the position of the mobile element by the locating system comprises steps of:
  detecting at least one signal coming from the mobile element by a camera present on a sensor forming part of the locating system,
  generating an image by a camera, comprising at least one point corresponding to the signal detected,
  transferring the image from the camera to a sensor data processing device,
  determining the coordinates and the size of each point on a matrix relating to the sensor by the data processing device,
  transferring the coordinates and the size of each point on the matrix relating to the sensor from the data processing device to a microcontroller forming part of the locating system,
  transferring the coordinates and the size of each point on the matrix relating to the sensor from the microcontroller to the server.

Advantageously, transferring the coordinates and the size of each point on the matrix relating to the sensor from the data processing device to the microcontroller is carried out by using $I^2C$.

Advantageously, transferring the coordinates and the size of each point on the matrix relating to the sensor from the microcontroller to the server is carried out by using Ethernet.

Advantageously, transferring the coordinates and the size of each point on the matrix relating to the sensor from the data processing device to the microcontroller is carried out, for a maximum number of points simultaneously, if the image contains more points than this maximum number, transferring the coordinates and the size of each point on the matrix relating to the sensor from the data processing device to the microcontroller is carried out several times.

The invention further proposes a method for installing a system for creating an environment comprising at least one image, the system comprising a projection system and a locating system, the method comprising steps of:
  positioning the projection system equipment,
  calibrating the projection system,
  positioning the locating system equipment, and
  calibrating the locating system.

This enables the positioning of the locating system equipment and/or the calibration of the locating system to be carried out as a function of the projection system.

Advantageously, calibrating the projection system comprises, for at least one projector forming part of the projection system:
  determining a part of the image which is comprised of a partial image projected by the projector,
  a projection by the projector of the partial image, and
  an adjustment of the partial image, so that the partial image corresponds to the part of the image determined during the determination.

Advantageously, calibrating the locating system comprises, for at least one sensor forming part of the locating system, steps of:
 determining the surface to cover by each sensor, and
 adjusting the position of each sensor, the adjustment of the position of each sensor comprising a projection, by the projection system, of an adjusted image indicating into which position to adjust the sensor.

Advantageously, the installation method further comprises a calibration, which comprises, for each one of the corners of the surface to be covered, steps of:
 projecting, by the projection system, of a marker to a specific location of the surface to be covered of each sensor, the specific location being indicated in a global coordinate system of the environment,
 positioning of a portable emitter near the projected marker, and
 measuring the calibration, during which the sensor determines the coordinates of the position of the portable emitter in a sensor matrix.

This method makes the calibration of the sensors particularly easy and quick, and also enables the locating system and the projection system to be aligned with each other.

Advantageously, the calibration further comprises a step of correspondence between specific locations to which the markers have been projected and the coordinates of the position of the portable emitter in the sensor matrix, the correspondence resulting in a means enabling to pass from the coordinates in the matrix from the sensor to the global coordinates.

This enables to pass from coordinates specific to each sensor as indicated in the matrix from the sensor to the global coordinates.

The invention further proposes, in an embodiment, a method for guiding a pilot of a mobile element, the guiding method comprising steps of:
 determining an optical trajectory for the mobile element,
 locating the mobile element by a locating system,
 determining at least one action that the pilot must carry out so that the mobile element connects to the optimal trajectory, and
 distributing to the pilot of a message containing advice so that the mobile element follows the optimal trajectory.

This enables to give pilot advice to the pilot. If several pilots are present, each one receives advice corresponding to their own situation.

The invention further proposes, in an embodiment, an anti-collision method of at least one mobile element comprising steps of:
 locating each mobile element by a locating system,
 determining the speed and acceleration of each mobile element,
 calculating the probabilities of positions of mobile elements in close proximity, and
 if the probability that several mobile elements are below a threshold distance, is higher than a determined probability, automatic braking occurs for the mobile elements in question.

This method enables to avoid collisions between mobile elements.

The invention further proposes a computer program for the implementation of a method according to the invention.

The invention further proposes a non-transitory storage media, whereon an IT program product is stored comprising parts of software code in a format that can be executed on an IT device and configured to carry out the steps of a method according to the invention.

The invention further proposes a mobile element comprising:
 an electronic interface (240), arranged to communicate with a server (400),
 at least one actuator connected to the electronic interface and arranged to be actuated by a pilot of the mobile element 200,
 at least one actuating means connected to the electronic interface and arranged to produce a modification of characteristics of the mobile element based on a signal received from the electronic interface.

The mobile element can be used with the server, independently from or in relation to one or several projection and locating systems.

Preferably, the connection between the electronic interface and the server passes by a board computer.

Advantageously, the mobile element further comprises a emitter.

Advantageously, the emitter comprises at least one electromagnetic radiation source.

Advantageously, each one of the electromagnetic radiation sources comprises an infrared emitter.

Advantageously, the electromagnetic radiation source comprises a light-emitting diode with a power of between 5 and 50 Watts.

The invention further proposes a projection system arranged to project at least one image, the system comprising at least one video stream computer to communicate with a server and at least one projector connected to the video stream computer.

The projection system according to the invention can be used with the server, independently of the mobile element and the locating system, or can be used with the server with the mobile element, but without the locating system or can be used with the server without the mobile element but with the locating system.

Advantageously, the projection system comprises a plurality of projectors, each one of the projectors being arranged to project a partial image such that all the partial images projected by the projectors form the image.

Advantageously, the partial images are at least partially covered.

The invention further proposes, a locating system comprising at least one microcontroller arranged to be connected to a server and at least one sensor connected to the microcontroller.

The locating system according to the invention can be used with the server, independently of the mobile element and of the projection system, or can be used with the server with the mobile element, but without the projection system or can be used with the server without the mobile element but with the projection system.

Advantageously, a connection between each sensor and the microcontroller to which the sensor is connector uses $I^2C$.

Advantageously, a connection between each microcontroller and the server uses Ethernet.

Advantageously, each sensor comprises a camera arranged to take an image and is capable of detecting infrared radiation.

Advantageously, the sensor further comprises a data processing device arranged to increase the resolution of the image taken by the camera.

Advantageously, the locating system further comprises a system for identifying the sensor, using which the server is capable of identifying the sensor from which information reaches it from among a plurality of sensors.

Advantageously, each sensor is connected to a display system comprising a plurality of light-emitting diodes, the sensor and the display system to which it is connected being arranged to light up a number of diodes equal to the number of mobile elements perceived by the sensor.

BRIEF DESCRIPTION OF THE FIGURES

Other characteristics and advantages of the invention will appear upon reading the detailed description which follows, for the understanding of which, the appended figures must be referred to, among which.

EMBODIMENTS OF THE INVENTION

The present invention is defined with specific embodiments and reference to figures, but the invention is not limited by these. The drawings or figures defined are only schematic and are not limitative.

In the context of the present document, the terms "first" and "second" only serve to distinguish the different elements and do not imply any order between these elements.

In the figures, same or similar elements can have the same reference. An element that is present several times, in other words, that has several representations, can have a reference with a same number but a different letter. In this case, the number alone, without the letter, indicates any of the representations of this element that is present several times. The different representations of one same element can have certain different characteristics. For example, the element 200 can have three representations 200a, 200b and 200c.

The elements coming from different embodiments of the invention can be combined while remaining in the framework of the invention.

Figure 1:
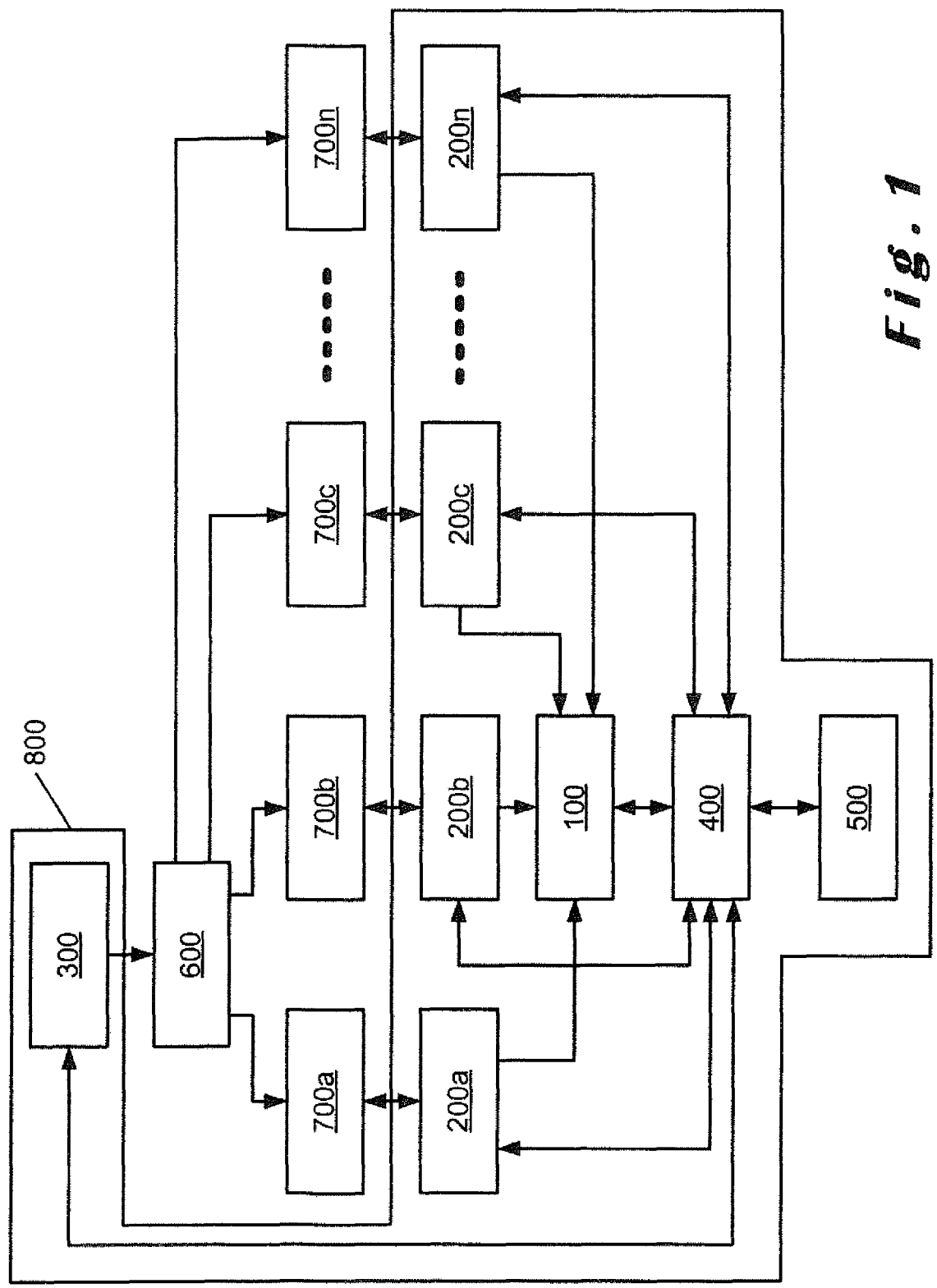
FIG. 1 illustrates a diagram of a system for creating an environment according to an embodiment of the present invention.

FIG. 1 schematises a system for creating an environment 800 according to an embodiment of the present invention, as well as an image 600 and at least one pilot 700a, 700b, 700c . . . 700n, capable of perceiving the image 600, n being a whole number equal or a number greater than 1. The system for creating an environment 800 comprises a projection system 300 arranged to project the image 600, at least one mobile element 200a, 200b, 200c . . . , 200n, each mobile element 200i being arranged to interact with the corresponding pilot 700i, a locating system 100 arranged to determine a position of each mobile element 200a, 200b, 200c, . . . , 200n, and a server 400, capable of exchanging information with the projection system 300, the locating system 100 and each mobile element 200a, 200b, 200c, . . . , 200n, i being a positive whole number and smaller than or equal to n. The system for creating an environment 800 also comprises a management device 500, capable of exchanging information with the server 400.

The projection system 300, each mobile element 200a, 200b, 200c, . . . , 200n and the locating system 100 are defined in detail, later in the present document. The image 600 is preferably projected on the floor, but could be projected on other media like a wall or a part of each mobile element 200a, 200b, 200c, . . . , 200n.

In the embodiments of the invention, the pilot 700 can be on the mobile element 200, for example, if the mobile element 200 is a kart, the pilot 700 can hold the mobile element 200, for example, if the mobile element 200 is the equipment of the pilot 700 or the pilot 700 can act remotely on the mobile element 200, for example, if the mobile element 200 is a remote-controlled car.

The server 400 ensures the coordination between the projection system 300, the mobile element 200, the locating system 100 and the management device 500 and also preferably executes other tasks. The server 400 can be distributed over several devices and possibly be in a place other than the environment created by the system for creating an environment 800.

The management device 500 enables a manager of the system for creating an environment to manage certain functions of it. For example, the management device 500 enables to view alarms transmitted by the server 400 and to manage them, enables to signal a kart as being faulty, so that it is no longer returned to another game, or to modify the automatic standby options. The management device 500 also enables to switch on the system for creating an environment, to start a karting game, to remove a player from the game, the restart the game following an emergency stop being pressed or following another fault detected automatically.

The management device 500 also enable information to be managed to display on TVs in the room where the system for creating an environment is installed, to send information to a website, to control the air-conditioning in the room, depending on the time of the games to come.

Figure 2:
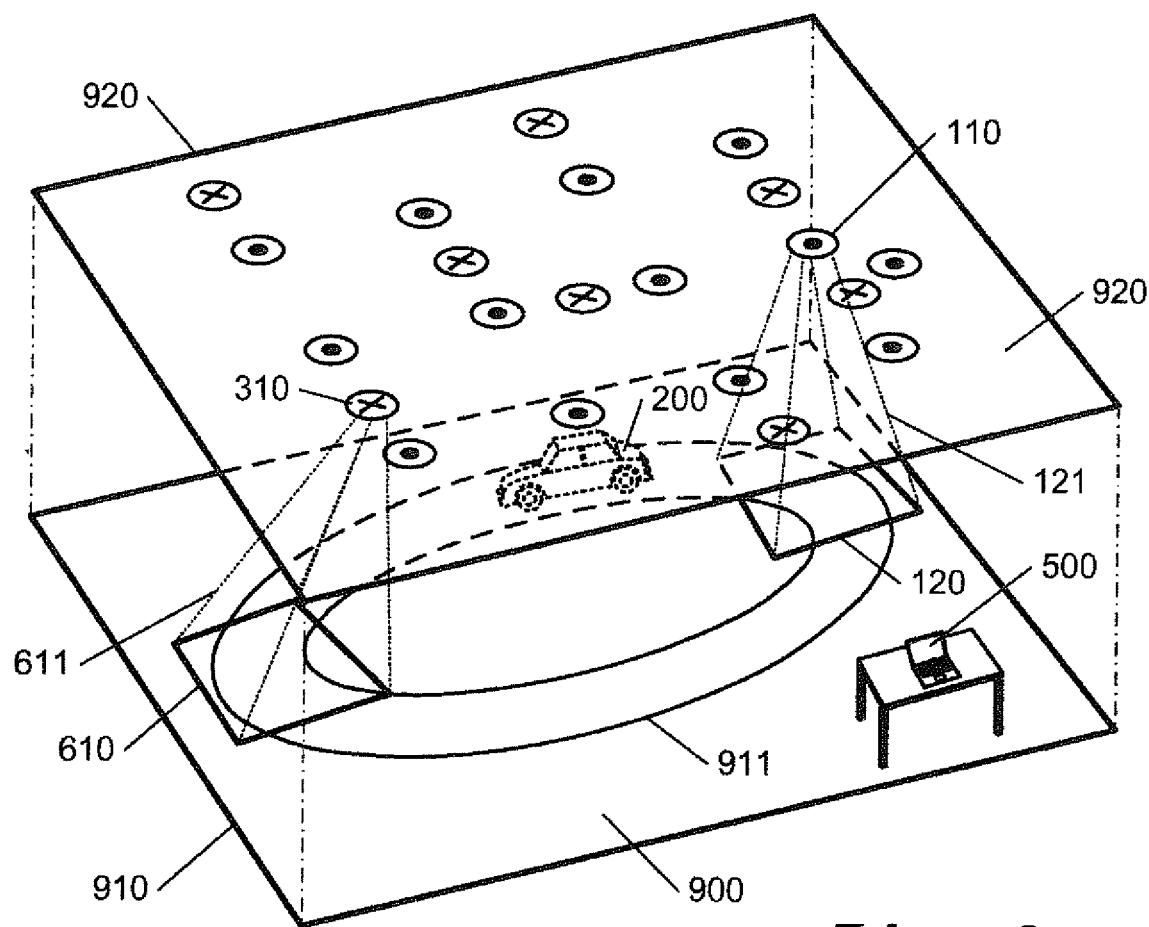
FIG. 2 illustrates an embodiment of an environment according to an embodiment of the present invention.

FIG. 2 illustrates an embodiment of the invention, wherein the mobile element 200 is a kart driven by a pilot 700, the projection system 300 comprises projectors 310, the locating system 100 comprises sensors 110 and the management device 500 is a computer. Only one kart is represented for more clarity, but it will be appreciated that more than one kart can be present in the environment. Numerous elements of the system for creating an environment 800 according to the invention are not explicitly represented in FIG. 2, even if they are present in the embodiment of the invention illustrated in FIG. 2.

The system for creating an environment 800 is installed in a room 900 comprising a floor 910 and a top section 920. The room 900 is preferably obscure so that the image 600 can clearly be seen. The floor 910 is preferably flat. The top section 920 comprises fastening means. For example, the top section 920 can comprise a ceiling or a beam structure, where the fastening means can be positioned.

FIG. 2 represents a projection cone 611 emitted by the projector 310 and a partial image 610 on the floor, resulting from the intersection of the projection cone 611 with the floor 910. The image 600 generated by the projection system comprises all the partial images 610 projected by all the projectors 310. In the example of FIG. 2, the image 600 includes a karting track 911. In the framework of the present document, a cone can have a circular, rectangular base, or a base of any shape.

FIG. 2 represents a capture cone 121, which corresponds to the zone perceived by the sensor 110. The intersection of the capture cone 121 and the floor 910 is a capture surface 120 of the sensor 110. All the capture surfaces 120 of the sensor 110 forming part of the locating system 100 preferably cover the whole image 600 so that the mobile element 200 located near the image 600 is visible by the locating system 100.

In an embodiment of the invention, all the capture surfaces 120 of the sensors 110 forming part of the locating system 100 do not cover the whole image 600.

In an embodiment of the invention, the image 600 does not cover all the capture surfaces 120 of the sensors 110 forming part of the locating system 100. For example, all the capture surfaces 120 can extend to stands located on the side of the karting track, while the image 600 is not projected there.

The image 600 preferably comprises constant elements like the track 911 and temporary elements like bonus or penalty images. The environment preferably comprises all the element and effects that can be perceived by the pilot of the kart, in other words, in particular the image 600, the kart itself with its elements and the other karts with their elements if they have them, effects being produced on the kart(s), like a vibration of the steering wheel, the displaying of an image on the dashboard, a free-wheeling effect, a slowing down, and additional effects like mood lighting.

A karting game preferably takes place in the following way. An administrator indicates on the management device 500 a form for the track 911 and a type of game chosen. Based on the track 911 and the type of game chosen, and potentially other information, the server 400 determines the information to send to the projection system 300 and to the mobile element 200 (to the mobile elements 200, if there are several of them) according to the information received from the management device 500. The projection system 300 projects, via the projectors 310, the image 600 corresponding to the track 911 and to the type of game chosen. The mobile element 200 adapts its characteristics to the track 911 and to the type of game chosen. For example, a controller that is present on an engine of a kart is adjusted so that the kart never exceeds a certain speed, or a dashboard is adjusted to display photos of all pilots taking part in the game. The mobile element 200 also comprises a emitter 210 (that can be seen in FIG. 3), which enables it to be located by the locating system 100.

Figure 3:
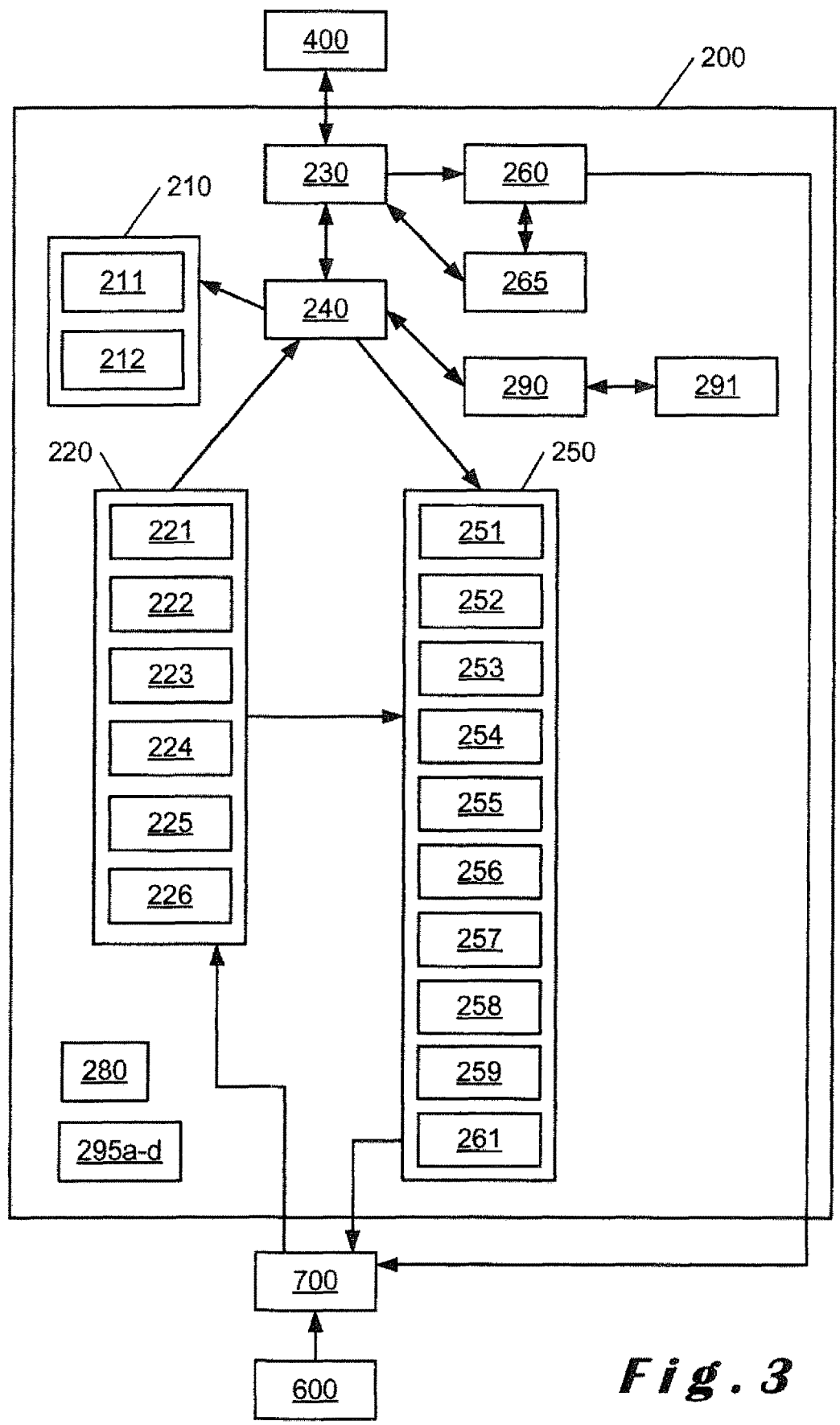
FIG. 3 illustrates a diagram of the server, the image and the elements of a kart in an embodiment of the invention.

FIG. 3 schematises the server 400, the image 600 and the elements of a mobile element 200 in an embodiment of the invention where the mobile element 200 is a kart.

The mobile element 200 communicates with the server 400 and with the pilot 700, who perceives the image 600. The mobile element 200 preferably comprises the following elements:
- a board computer 230,
- an electronic interface 240,
- a dashboard 260,
- a camera 265,
- a emitter 210,
- a plurality of pilot actuators 220,
- a plurality of actuating means 250,
- a seat 280,
- a battery 290 or another power means,
- a battery charger 291,
- four wheels 295a, 295b, 295c, 295d.

The plurality of pilot actuators 220 preferably comprises:
- an accelerator 221,
- a brake 222,
- a steering wheel 223,
- at least one start button 224,
- an emergency stop button 225,
- a presence sensor in the seat 226.

The plurality of actuating means 250 preferably comprises:
- a right engine 251,
- a left engine 252,
- a seat vibrator 253,
- a steering wheel vibrator 254,
- steering wheel button lights 255,
- a rear screen 256,
- a plurality of traffic lights 257,
- a gun 258,
- at least one loudspeaker 259, and
- a system for controlling direction.

The emitter 210 comprises at least one electromagnetic radiation source, which can be an infrared lamp. The emitter 210 more preferably comprises at least two electromagnetic radiation sources. Having two sources enables one of the sources to always be active in the event of the other one failing. The emitter 210 even more preferably comprises a first infrared lamp 211 and a second infrared lamp 212. The electromagnetic radiation source is preferably of variable intensity. Preferably, the board computer 230 sends power to the electronic interface 240, which must emit the infrared LED 211, 212. In an embodiment of the invention, the infrared LED 211, 212 can have two states: switched-off and switched-on at full power states.

The mobile element 200 preferably comprises an antenna connected to the board computer 230, in particular to communicate with the server 400. The antenna can, for example, be a wi-fi antenna. In an embodiment of the invention, the antenna is integrated in a tablet which serves as a board computer 230 and as a dashboard 260. In an embodiment of the invention, the wi-fi is secured by WPA2-PSK, but another type of security could be used.

The mobile element 200 can comprise other buttons with different uses according to the game world (bonus use, change of bonus, etc.).

The pilot starts their kart. They adapt the driving of the kart, by actuating the actuators 220, like the accelerator 221, the brake 222, the steering wheel 223, the form of the track 911, the effects of the actuating means 250 and the presence of other karts, if there are any. The instructions 202 given by the pilot 700 by actuating the actuators 220 generate instructional information which is sent to the server 400. The locating system 100 constantly determines the position of the kart, as long as the kart is within all of the capture surfaces 120 of the sensors 110 (FIG. 2) and sends corresponding positional information to the server 400.

The server 400 determines, based on the instructional information and based on the positional information, the next step of the game. This step can be the projection of the image of an object in front of the kart, the possibility for the kart to go quicker, a change in form of the track, the possibility for the pilot 700 to shoot at another pilot using a gun 258 mounted on the kart, etc. This shooting can be virtual with one or several partial image(s), making it visually perceptible. This shooting can also use a laser pointer. This next step can also be that nothing changes in the image 600 and in the characteristics of the mobile element 200. The management device 500 can possibly intervene in this determining of the next step, for example, by limiting the speed of all the karts, by acting on their engine 251, 252 if the administrator deems that the pilots are driving too dangerously.

The server 400 is a device located near the system for creating an environment 800 or at a distance from it. The connection between the server 400 and the system for creating an environment 800 can be made by the internet. The server 400 can manage several systems for creating an environment 800 at the same time. The server 400 preferably comprises an antenna, in particular to communicate directly with the mobile element 200. The server 400 can be a set of elements like a set of computers.

The board computer 230 communicates with the server 400, with the electronic interface 240 and with the dashboard 260. The board computer 230 receives and sends information in the form of digital signals. The board computer 230 can comprise several computers and/or the mobile element 200 can comprise several board computers.

The electronic interface 240 enables to send analogue signals, send digital signals, receive analogue signals and receive digital signals.

The electronic interface 240 is preferably a printed circuit board capable of transforming digital signal received from the board computer 230 into analogue signals intended for elements other than the board computer 230, to which it is connected, in other words, the emitter 210, the battery 290, the actuators 220 and the actuating means 250.

In an embodiment of the invention, the board computer 230 and the electronic interface 240 enable the mobile element 200 to communicate in real time with the server 400. In another embodiment of the invention, the mobile element 200 does not comprise a board computer 230 and the electronic interface 240 communicates directly with the server 400.

The server 400 can thus influence the behaviour of the mobile element 200 via the actuating means 250. The server 400 can thus receive information concerning the instructions given by the pilot 700 by actuating the actuators 220.

The dashboard 260 is a device capable of displaying information for the pilot 700. For example, the dashboard 260 can be a screen or a tablet computer screen. The dashboard 260 preferably receives information from the board computer 230 in the form of digital signals and potentially sends it. In an embodiment of the invention, the dashboard 260 and the board computer 230 are one same equipment. The dashboard 260 can, for example, display information concerning the brake status, the accelerator status, a bonus that is ready to be used, a status of the pilot's health, a blinding flash, advertisements, etc.

The camera 265 is capable of taking photos and/or filming. The camera 265 can be included in the tablet computer which also includes the dashboard 260. The camera 265 sends images that it captures to the server 400, preferably passing via the board computer 230.

The emitter 210 transmits a signal, preferably an electromagnetic wave, enabling the location of the mobile element 200 by the locating system 100, and in particular, by the sensors 110. The emitter 210 transmits a signal, mainly to the top, if the sensors 110 are located high up in relation to the mobile element 200. The LEDs 211, 212 are preferably powerful infrared LEDs. The LEDs 211, 212 preferably have a power of between 5 and 50 Watts. The LEDs 211, 212 more preferably have a power of 15 Watts. The LEDs 211, 212 preferably have a wavelength of 900 nm. These LEDS enable the locating system 100 to locate the mobile elements 200 correctly, whatever the emission angle of the signal transmitted by the emitter 210 and the angle of incidence of this signal on the sensors 110.

The fact that the emitter 210 preferably comprises two signal sources, in other words, the two, powerful infrared LEDs 211, 212, enables in the case of one of the two signal sources having a fault, for the other one to always enable the mobile element 200 to be located. Instead of or in addition to the powerful infrared LEDs 211, 212, the emitter 210 can potentially comprise one or several of the following signal sources, in one or several specimens: a filament lamp, an infrared filament lamp, an assembly of infrared LEDs which, taken individually, do not have enough power to be perceived reliably by the sensors, but together have enough power to be perceived reliably by the sensors.

The actuators 220 are bodies which enable the pilot 700 to give instructions to the mobile element 200. The actuators 220 are preferably separate from each other and the electronic interface 240 communicates independently with each one of the actuators 220. The actuators 220 receive information from the pilot 700, in the form of movements (foot movement for the brake, for example, or touching an icon) and send information to the electronic interface in the form of analogue signals. The content of this information is then transmitted to the board computer 230 in the form of digital signals, for example, by an Ethernet protocol, then to the server 400 in the form of digital signals. The start button 224 is preferably located on the steering wheel 223. Certain actuators 220 can be located on the tablet computer, of which the screen forms the dashboard 260.

In an alternative embodiment of the invention, one or several actuators 220 have a direct action on one or several actuating means 250 and/or elements of the mobile element 200. For example, the steering wheel 223 can act on an axis to orient the mobile element 200.

The actuating means 250 are bodies which enable the electronic interface 240 to act on the elements belonging to the mobile element 200. The actuating means 250 are preferably separate from each other and the actuating means 250 communicate independently with the electronic interface 240. In an embodiment of the invention, it is possible that certain actuators 220 act on certain actuating means 250 without passing through the electronic interface 240.

For example, to create a sensation of losing control of the kart by the pilot 700, the server 400 can request that the right engine 251 makes the right rear wheel 295*a* brake, while the left engine 252 makes the left rear wheel 295*b* accelerate. This request is relayed from the server 400 to the board computer 230, then to the electronic interface 240, which transmits it to the right engine 251 and to the left motor 252.

Preferably, to create a sensation of losing control of the kart by the pilot 700, the server 400 informs the board computer 230 of the mobile element 200 (affected by a bonus, risk of collision and potentially effects which arise from these, etc.) and the board computer 230 makes the speed calculation sent to each one of the engines 251, 252. This enables information from the accelerator not needing to go to the server 400 to be utilised for the acceleration calculation to be sent to each engine 251, 252.

The speed calculation sent to each one of the engines 251, 252 can also be in the server 400 or in the electronic interface 240 which preferably comprises one or several microcontrollers.

The sensation of losing control can also be created by directional wheels turning independently from the desire of the pilot by disengaging the steering wheel (or not).

The engines 251, 252 preferably act on the rear wheels and can make the wheel accelerate, brake or vibrate, by successively accelerating or braking closer together over time.

The loudspeaker(s) 259 can be present on a body of the mobile element 200, for example, on the kart or on a helmet, for example, a helmet for motorsport, worn by the pilot 700. If the pilot 700*a* of the mobile element 200*a* uses their gun 258 to shoot a second mobile element 200*b*, a shooting sound with the sound of a bullet which has been shot out can be produced by its loudspeaker 259 while the pilot 700*b* of the second mobile element 200*b* has their loudspeaker, which produces the sound of a bullet that is approaching them, the intensity of this sound of a bullet approaching depending on the relative positions of the mobile element 200*a* from where the shot is fired and of the second mobile element 200*b*.

The lighting up of steering wheel 255 buttons preferably corresponds to four steering wheel 255 buttons.

The rear screen preferably displays the name of the pilot 700 driving the mobile element 200, their position and their colour (according to their level or according to their team, according to the type of game).

The battery 290 is an electric battery, which can be charged by the battery charger 291. A fuel cell in place of the battery 290 is also possible in the framework of the present invention. The battery 290 preferably communicates with the server 400 via the electronic interface 240 and the board computer 230 so that the server 400 receives information concerning the battery 290 charge status. A DC/DC transformer is, for example, connected to the battery 290 to transform the 48 V generated by the 12 V battery 290 so as to supply the board computer 230 with electricity, which functions with 12 V, and the electronic interface 240, which also functions with 12 V.

In an embodiment of the invention, the mobile element 200 includes four electronic boards. Three of the electronic boards are supplied with 12 V with a regulator which transforms the 12 V into 5 V, as a microprocessor present on the board uses 5 V. The fourth electronic board is supplied directly with 5 V.

The elements comprised in the mobile element 200 in the embodiment of the invention where the mobile element 200 is a kart, are not necessarily present in all embodiments of the invention, or can be present without being present on the mobile element 200.

In an embodiment of the invention, the mobile element 200 can be a remote-controlled car, to which case the pilot 700 controls the remote-controlled car from distance by watching the image 600 and actuating the actuators 220 which are not on the remote-controlled car.

In an embodiment of the invention, the mobile element 200 is the equipment held by the pilot 700. For example, the mobile element 200 is a laser game player, which is the pilot 700, and this person's laser game equipment, which comprises a gun 258, a emitter 210, a start button 224, etc. but does not comprise an engine 251, 252 or a steering wheel 223.

In an embodiment of the invention, the mobile element 200 is a robot which moves around a factory and which is actuated by the server 400 without the intervention of a pilot perceiving the image 600. In this case, the actuators 220 are not present on the robot, but there can be more actuating means 250 so that the server 400 via the board computer 230 and the interface 240 controls the robot. The robot can potentially comprise a camera 265, capable of perceiving the image 600.

Figure 4:
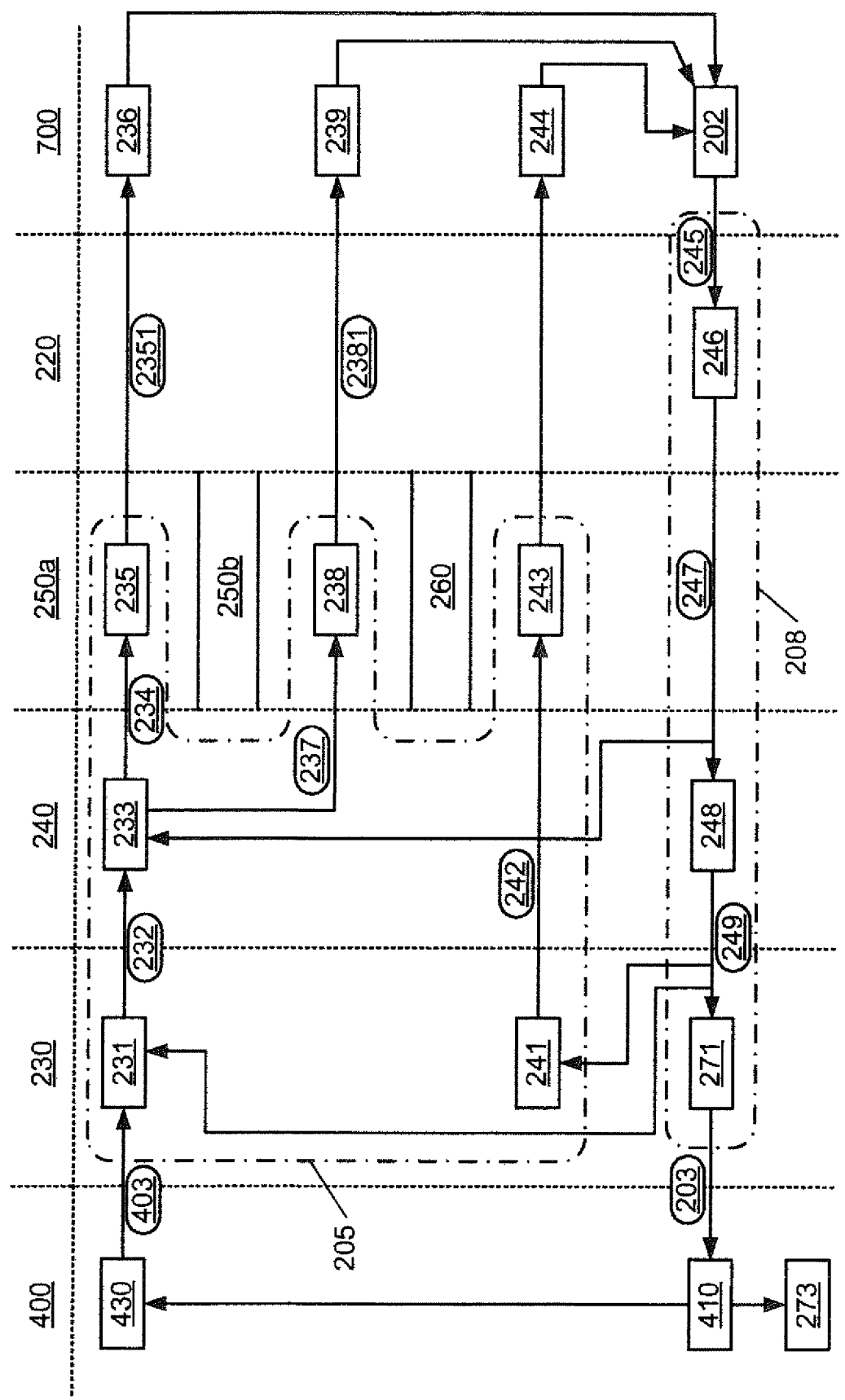
FIG. 4 illustrates a functioning of the mobile elements according to an embodiment of the present invention.

FIG. 4 schematises a functioning 299 of the mobile element 200, considering interactions with the server 400, according to an embodiment of the present invention.

The server 400 determines 430 characteristic information which results in characteristic information 403 which is sent to the board computer 230. The characteristic information 403 can be adapted to each one of the mobile elements 200 present in the system for creating an environment 800.

Based on the characteristic information 403, the board computer 230 determines 241 information for the dashboard, which results in information 242 for the dashboard which is sent to the dashboard 260. Based on the information 242 for the dashboard, the dashboard 260 modifies 243 the display which is perceived by the pilot 700 during a step of perceiving 244 the display modification.

Based on the characteristic information 403, the board computer 230 determines 231 information for the electronic interface, which results in information 232 for the electronic interface which is sent to the electronic interface 240. Based on the information 232 for the electronic interface, the electronic interface 240 determines 233 signals for the actuating means. This determination 233 of signals for the actuating means comprises, for one or several actuating means 250, the determination of a preferably analogue signal value, which will be sent to the actuating means 250 in question.

The determination 233 of signals for the actuating means results in a signal 234 for a first actuating means which is sent to a first actuating means 250*a* which, based on the signal 234, modifies 235 its characteristics. Potentially, the determination 233 of signals for the actuating means results in a signal 237 for a second actuating means, a signal for a third actuating means, etc. Thus, the second actuating means 250*b* is based on the signal 237 modifying 238 its characteristics, etc.

The modification 235 of the characteristics of the first actuating means 250*a* results in an effect 2351 which is perceived by the pilot 700, during a step of perceiving 236 the effect coming from the first actuating means 250*a*. The modification 238 of the characteristics of the second actuating means 250*b* results in an effect 2381 which is perceived by the pilot 700, during a step of perceiving 239 the effect coming from the second actuating means 250*b*. To revisit the example given above, the pilot 700 perceives that they are losing control of their kart, as the right rear wheel brakes, while the left rear wheel accelerates. The fact that the right rear wheel brakes while the left rear wheel accelerates corresponds to the modification 235 of the wheel characteristics. Each one of the actuating means 250, in particular, those indicated in FIG. 3, can, similarly, have a modification 235 of one or several of its technical characteristics.

The pilot 700 reacts to the perception 277 of the dashboard display and to the perceptions 236, 237 of the effects, by giving instructions 202 via a movement 245 on one or several actuators 220. For example, the pilot 700 straightens their kart by turning the steering wheel 223 in reaction to losing control. The movement 245 of each one of the actuators 220 actuated triggers, through the actuator in question, a determination 246 of an actuator signal which results in an actuator signal 247 which is transmitted to the electronic interface 240. Based on the actuator signals 247, the electronic interface 240 determines 248 information for the board computer, which results in a signal 249 for the board computer which is transmitted to the board computer

230. Based on the actuator signals 247, the electronic interface 240 can also determine 233 signals for the actuating means which restarts a first loop: electronic interface 240→actuating means 250→pilot 700→actuators 220→electronic interface 240.

Based on the signal 249 for the board computer, the board computer 230 determines 271 information for the server which results in information 203 for the server which is sent to the server 400. Based on the signal 249 for the board computer, the board computer 230 also determines 231 information for the electronic interface, which restarts a second loop: board computer 230→electronic interface 240→actuating means 250→pilot 700→actuators 220→electronic interface 240→board computer 230.

Based on the signal 249 for the board computer, the board computer 230 also determines 241 information for the dashboard which restarts a third loop: board computer-→dashboard 260→pilot 700→actuators 220→electronic interface 240→board computer 230.

Based on the information 203 for the server, the server 400 determines 430 characteristic information, a determination 420 of projection information which will be defined later or other steps 273 which can bring into play the management device or other elements like mood lighting.

Determining 430 characteristic information restarts a fourth loop, which is potentially double: server 400→board computer 230→electronic interface 240→actuating means 250→pilot 700→actuators 220→electronic interface 240→board computer 230→server 400 and server 400→board computer 230→dashboard 260→pilot 700→actuators 220→electronic interface 240→board computer 230→server 400.

One or several of the first, second, third and fourth loops are constantly produced at high frequency, for example, up to 100 times per second, for the whole time where the mobile element 200 functions.

All of the steps for determining 231 information for the electronic interface, determining 233 signals for the actuating means, modifications 235, 238 characteristics of the actuating means, determining 241 information for the dashboard and modifying 243 the display is thereafter resumed in the step for adapting 205 the characteristics of the mobile element. Adapting 205 the characteristics of the mobile element The steps for determining 246 an actuator signal, determining 248 information for the board computer and determining 271 information for the server is thereafter resumed in the step for transferring 208 instructions. The transfer 208 of instructions can, however, comprise other steps.

In an embodiment of the invention, it is possible that certain actuators 220 act directly on certain actuating means 250. For example, the mechanical brake of a kart according to the invention preferably functions as on a standard kart and has priority over the accelerator. Engine controllers are programmed so that as soon as the acceleration requested by the pilot is zero, the engines brake. A relay disconnects the accelerator as soon as the pilot touches the brake pedal so as to avoid braking and accelerating at the same time, which has the effect, as soon as the brake is touched, of the acceleration being sent to the controllers being zero and the engines braking.

This solution enables to have several safety measures for the kart braking and to avoid the kart having unwanted behaviour in the event of incorrect programming of the microcontrollers or the board computer.

In another embodiment of the invention, the engine controllers are reprogrammed in real time with the board computer. The mechanical brakes of the standard karts are then possibly removed from the mobile element according to the invention and in this case, braking information first passed through the electronic interface before acting on the kart.

Each controller takes the direct current from the batteries and transforms it into current suitable for the engine to which it corresponds. Engines are preferably the "brushless" type, which means that the current also functions with the engine's angle of rotation.

The mobile element 200 preferably includes an emergency stop method. Using the emergency stop method, a controller present on the right engine 251 and a controller present on the left engine 252 are configured so that in the absence of a signal 234 coming from the electronic interface 240 for the engine in question, the mobile element 200 brakes heavily. This enables the mobile element 200 to slow down quickly in the event of a problem, in particular, in the event of a problem connected to the electronic interface 240. Such a method can also be used on all the actuating means 250.

The mobile element 200 preferably includes a free-wheeling method. Using the free-wheeling method, when the pilot 700 releases the accelerator 221, the board computer 230 sends to the electronic interface 240, in the information 232 for the electronic interface, a digital message indicating that their engines 251, 252 must act as if the wheels were free-wheeling. For example, when the mobile element has a given speed and when the acceleration suddenly goes from a value A1 to a lower value A2, the board computer 230 sends to each iteration A=A1−p*(A1−A2), with a parameter P being of a value between 0.001 and 0.1. This enables to progressively reduce the speed of the element, without making it brake suddenly and having the requested acceleration with time. The electronic interface 240 then sends, in the signal 234 for the right engine and in the signal 234 for the left engine, an analogue message indicating to the engines 251, 252 that they must act as if the wheels were free-wheeling. This enables to avoid the mobile element 200 not braking suddenly when the accelerator 221 is released by the pilot 700.

The system can function without certain actions being transmitted to the server 400. The board computer receives information from the server and it is the board computer that determines what is sent to the electronic interface, based on the actuators actuated by the pilot and the information received from the server. The status of the emergency stop button is, for example, preferably sent to the server. However, the status of the accelerator is preferably not sent to the server.

In an embodiment of the invention, the engine controller is reprogrammed in real time, so that the controller does not make the engines brake when the requested acceleration is zero.

Figure 5:
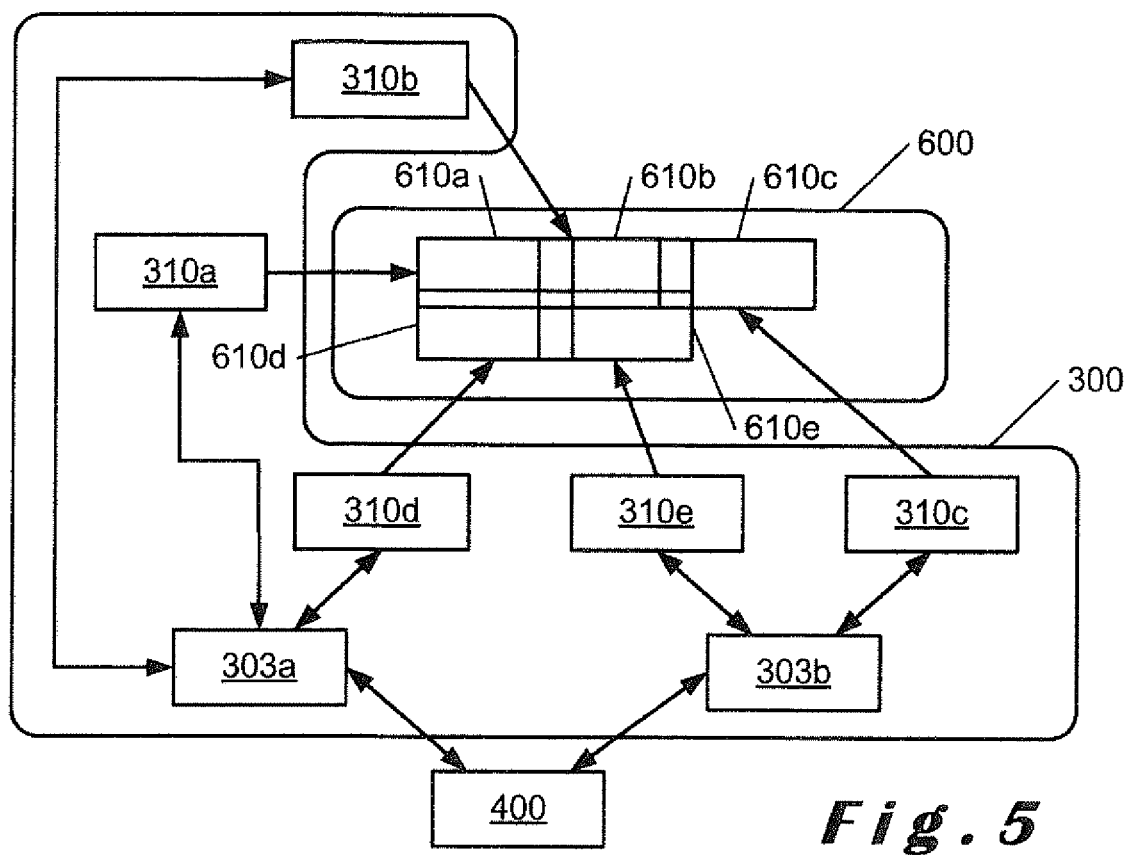
FIG. 5 illustrates a diagram of the projection system according to an embodiment of the present invention.

FIG. 5 schematises the projection system 300 according to an embodiment of the present invention, and also have an image 600 projected by the projection system 300 and the server 400.

The projection system 300 comprises a plurality of video stream computers 303 and a plurality of projectors 310. Each video stream computer 303 communicates with the server 400. The server 400 can act as a video stream computer 303. Each video stream computer 303 manages at least one projector 310 with which it communicates. Each projector 310 preferably includes an FPGA-type electronic circuit.

The video stream computer 303 preferably switches on the standby mode of the projectors 310 that it manages, but this can also be done directly by the server 400, the management device 500 or another device. The video stream computer 303 receives, from the projector 310 that it manages, information concerning its temperature, its alarms if there are any, and transmits this information to the server 400, which records it in order to anticipate possible faults.

As already defined in FIG. 2, each projector 310 emits a projection cone 611 resulting in the intersection of the cone 611 with a surface, which is preferably a floor, this is the partial image 610. The projector 310 is preferably focused so that the partial image 610 is clear. The image 600 generated by the projection system comprises all the partial images 610 generated by all the projectors 310.

In an embodiment of the invention, the actions carried out by the video stream computer 303 can be carried out by the server 400. Thus, there is no video stream computer 303 as such.

The video stream computer 303 can be a relatively simple piece of equipment and/or it can have not much calculating power, like a Raspberry Pi or a smartphone with a video output. In an embodiment of the invention, the video stream computer 303 has a device for sending images wirelessly, or any other device enabling to generate an image and send its signal to a projector 310.

In an embodiment of the invention, the projector 310 and the video stream computer 303 are only one single and same piece of equipment, for example, a smartphone that has a video projector incorporated.

Figure 6:
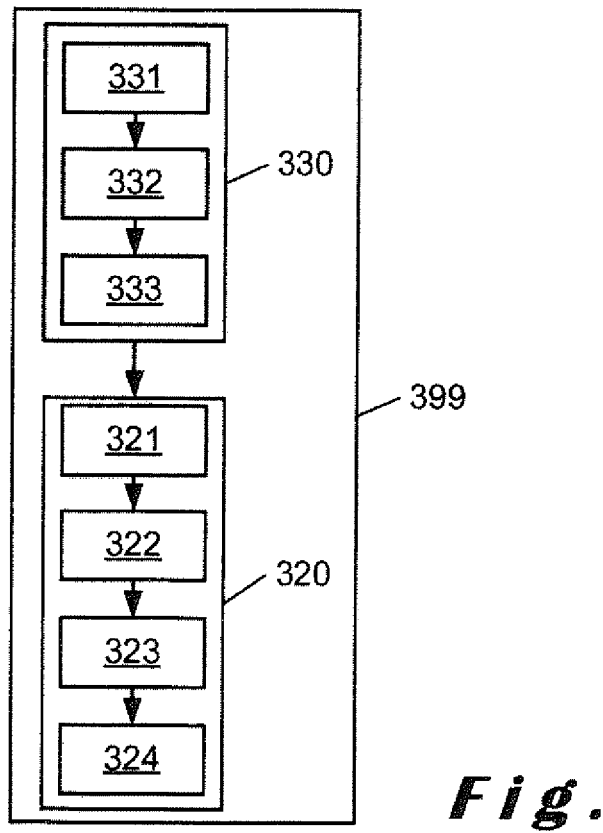
FIG. 6 illustrates a diagram of an installation of the projection system according to the present invention.

FIG. 6 schematises an installation 399 of the projection system 300 according to the present invention. The installation 399 of the projection system comprises a positioning 330 of the projection system equipment and a calibration 320 of the projection system.

The positioning 330 of the projection system equipment comprises a positioning 331 of the projectors, a positioning of the computers 303 and a positioning 333 of cabling (or an installation of a wireless system) between the projectors 310, the video stream computers 303 and the server 400.

The projectors 310 are preferably positioned high up and project their partial image 610 towards the floor. The partial image 610 projected by the projector 310 is as large as the projector 310 and the image 610 are distant from each other, but the more the distance between them increases, the more the luminosity of the partial image 610 decreases and the more visible the pixels are on the partial image 610. A pixel of the partial image 610 preferably covers a surface of less than 1 cm×1 cm.

In an embodiment of the invention, the projectors 310 are wide-angle projectors positioned at a height of around 6 m in relation to the floor and the partial images 610 are 10 m×7.5 m.

The projectors 310 are preferably positioned so that the partial images 610 from the different projectors 310 are covered so as to avoid a space without an image between the partial images 610. Therefore, there is an overlapping zone at the limit between the partial images 610 from several projectors 310. In order to avoid having a double luminosity zone in this overlapping zone, a shelving filter towards the black is applied in this zone to have a consistent luminosity and hide the projection limits. For example, overlapping can be done over a zone of 30 pixels.

However, it is not necessary for the partial images 610 to overlap.

The projectors 310 are preferably positioned according to limitations, due to the environment wherein the projection system 300 is implemented. These limitations can be due to a beam structure, in the form of a ceiling, in the form of a framework that is pre-existing or implemented for the projection system 300.

The projectors 310 are preferably positioned against each other to form a grid which covers the whole of the surface whereon it is desired to project the image 600. The projectors 310 do not need to be aligned. This represents an advantage of the projection system 300 according to the invention, as an alignment of the projectors 310 is sometimes difficult to achieve, in particular, because of limitations due to the environment wherein the projection system 300 is implemented.

The surface whereon it is desired to project the image 600 is preferably between 100 and 100000 $m^2$. The surface whereon it is desired to project the image 600 is more preferably between 1000 and 10000 $m^2$.

There are preferably between 10 and 10000 projectors 310. There are more preferably between 20 and 100 projectors 310. There are even more preferably between 1 and 200 projectors 310.

The video stream computers 303 are preferably positioned so as to minimise the length of the HDMI cables between the video stream computers 303 and the projectors 310. The video stream computers 303 can be positioned in the local server and transmit images over long distances via the optical fibre, or a projection computer can be used by the projector and be positioned just next to it.

The calibration 320 of the projection system comprises, for each projector 310, a determination 321 of a surface corresponding to the partial image 610, a choice 322 of display resolution, a projection 323 of the partial image 610 and an adjustment 324 of the partial image 610, so that the partial image 610 actually corresponds to the determined surface. This adjustment 324 is preferably made by an adjustment of one or several angles of the partial image 610 carried out by the FPGA of the projector 310. This adjustment 324 is preferably made by a "Quick Corner"-type function, available on certain projectors of the Epson brand. The adjustment 324 could be made by video stream computers 303.

The determination 321 of a surface corresponding to the partial image 610 determines the part of the image 600 which is comprised in the partial image 610 and includes the recording of the coordinates of the partial image 610 in a global coordinate system. Preferably, if the partial image 610 is a quadrilateral, the coordinates of the four corners of the partial image 610 are recorded in the server 400 and/or the video stream computer 303 which manages the projector 310.

All the calibration 320 is preferably carried out automatically by software running on the server 400 and/or on several video stream computers 303. More preferably, all the calibration 320 for the project 310 is carried out using software executed on the management device 500. For example, an operator indicates to the server 400 via the management device 500, which point they want to calibrate and calibrate it, and the server 400 records the value and/or the sending to the projector.

Figure 7:
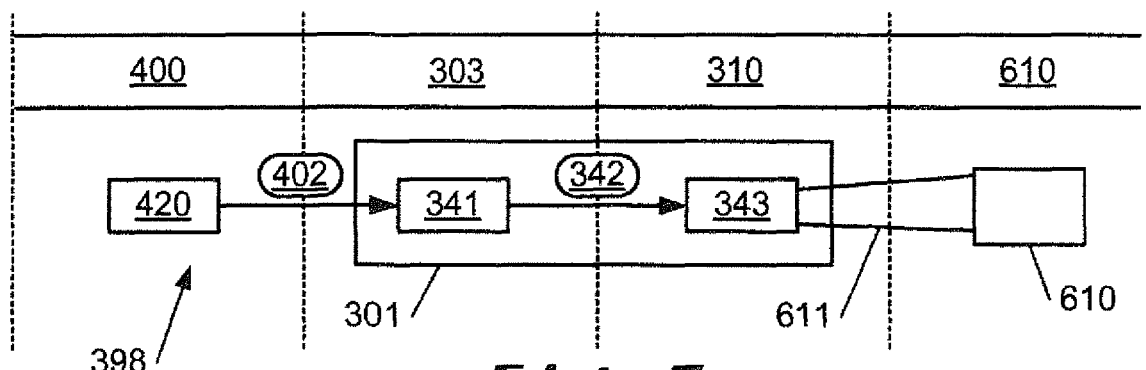
FIG. 7 illustrates the functioning of the projection system according to the present invention.

FIG. 7 schematises a functioning 398 of the projection system 300 according to the present invention. The server 400 determines 420 projection information which results in projection information 402. The projection information 402 comprises information concerning the image 600 (for example, a karting track or a karting arena), the different mobile elements 200 and their position, their direction, their status (in appearance, their life (in %), in disappearance, invisible). The same projection information 402 is preferably sent to all video stream computers 303.

During a step of determining 341 a video stream, each video stream computer 303 determines a video stream for each projector 310 that it manages, based on the projection information 402 and the coordinates of the partial images 610 from said projector 310. Determining 341 a video stream preferably comprises a facilitation of the content of the partial images 610 so that an element of the image 600 does not move intermittently. Determining 341 a video stream comprises managing a status change. For example, when one reaches its target, the missile explodes and an explosion animation is displayed. Determining 341 a video stream ensures synchronisation between the different video stream computers 303.

Determining 341 a video stream preferably includes a graphic engine which is distributed over different video stream computers 303, each video stream computer 303 determining 341 a video stream corresponding to the partial images 610 from the projectors 310 that it manages.

Determining 341 a video stream results in a video stream 342 which is different for each projector 310, and which comprises the visual appearance of the partial image 610. The video stream 342 is sent to the corresponding projector 310 which, based on this video stream 342, projects 343 the image 610 by having it possibly adjusted to distort it. A projection 301 carried out by the projection system 300, such as defined later with the support of FIG. 12, comprises steps of determining 341 a video stream and projecting 343 an image.

Figure 8:
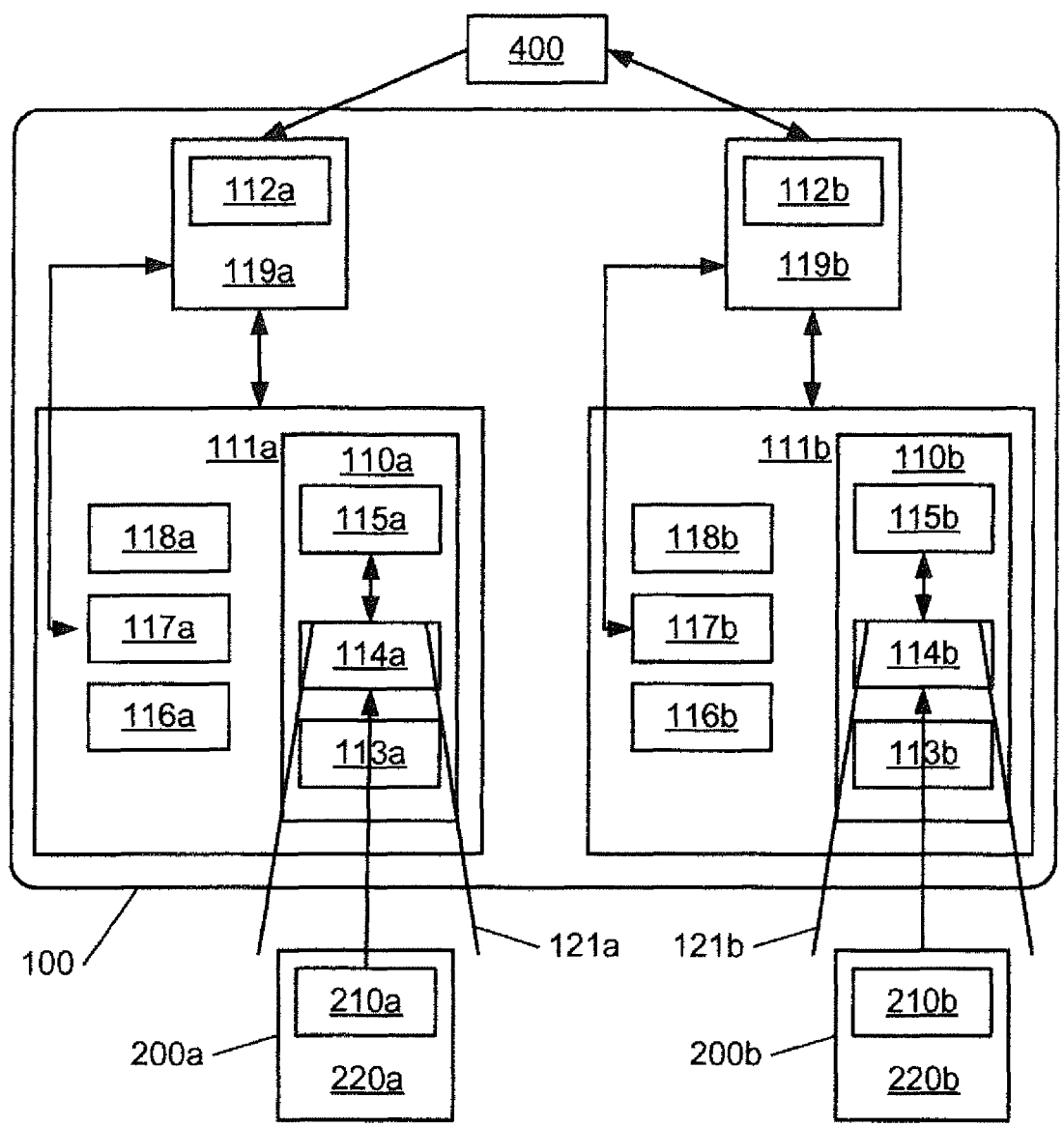
FIG. 8 illustrates a diagram of the locating system according to an embodiment of the present invention.

FIG. 8 schematises the locating system 100 according to an embodiment of the present invention, and also has a plurality of mobile elements 200, of which two 200a, 200b are illustrated, and the server 400.

The locating system 100 preferably comprises a plurality of second circuits 119, each one of the second circuits 119 comprising a microcontroller 112. Only two second circuits 119a, 119b are illustrated. Each second circuit 119 communicates with a first electronic circuit 111, which preferably comprises a sensor 110, a display system 117 and a system 118 for identifying a sensor and optionally, calculation means 116. In an embodiment of the invention that is not illustrated, a second circuit 119 communicates with several first electronic circuits 111 and/or at least one second circuit 119, the electronic circuit 111 comprises more than one sensor 110.

In an embodiment of the invention, each first circuit 111 is combined with the second circuit 119 corresponding to it.

Each sensor 110 has a capture cone 121 and perceives the mobile elements 200 present in its capture cone 121. In particular, the sensors 110 perceive signals transmitted by the emitters 210 present in their capture cone 121.

The sensor 110 is capable of detecting the infrared radiation. The sensor 110 preferably comprises a filter 113, a camera 114 and a data processing device 115. The filter 113 is preferably a filter that lets the infrared pass through it. The camera 114 is preferably a monochrome camera, capable of detecting the infrared radiation, and comprises, for example, a matrix of 128×96 pixels. The data processing device 115 is, for example, an FPGA.

The camera 114 takes an image at a first resolution and sends this image to the data processing device 115. The data processing device 115 analyses subpixels to increase the resolution of the images taken by the camera 114 and obtain a second resolution higher than the first. This second resolution, for example, of 1024×768 pixels, is at the size of a sensor matrix 112 which is output information from the sensor 110.

Each sensor 110 locates up to four mobile elements 200 on the sensor matrix 122 of 1024×768 pixels with a frequency of 500 Hz.

The display system 117 is preferably composed of a plurality of light-emitting diodes. The display system 117 is more preferably composed of four light-emitting diodes. The display system 117 communicates with the sensor 110 so as the number of light-emitting diodes lit up is equal to the number of points detected by the sensor 110.

The sensor identification system 118 is preferably capable of creating an identifier of the sensor 110a. Using the identifier of the sensor 110a, the server 400 identifies positional information 102 coming from the sensor 110a potentially via the microcontroller 112a, as coming from this sensor 110a among the plurality of sensors 110 connected to the server 400. This identification by the server 400 is preferably made by including the identifier of the sensor 110 in the address of the sensor 110. This enables the server 400 to not need to read the content of the positional information 102 to identify the sensor at its origin.

The sensor identification system 118 is preferably composed of a first plurality of contact elements, wherein the contact elements have a reference starting with X and a second plurality of contact elements, wherein the contact elements have a reference starting with Y. During the installation of the sensor 110, contacts are created on its contact elements (for example, by positioning the rider) so that the position of the sensor in a first direction (X coordinate) is indicated by all the contact elements of the first plurality, where a contact is made, and the position of the sensor in a second direction (Y coordinate) is indicated by all the contact elements of the second plurality, where a contact is made. These X, Y coordinates are then picked up in an address, for example, an IP address, of the second circuit 119 which enables the server 400 to identify the second circuit 119 and consequently the sensor 110 corresponding to the second circuit 119. The server 400 thus identifies which sensor 110 the information originates from, using the address where the information originates from. This removes the limitation of having the second circuits 119 or the sensor 110 identified by the server 400 using a software element.

In an embodiment of the invention, the information concerning the identification of the sensor 110 is located in the bytes 3 and 4 of the IP address of the sensor 110. In other words, the last two figures of the IP (IPV4) specify the ID of the sensor 110.

A function of the microcontroller 112 is the question the sensor 110. Another function of the microcontroller 112 is to transmit information received from the sensor to the server 400. Another function of the microcontroller 112 is to light up the diodes of the display system 117.

Communication between the first electronic circuits 111 and the second circuits 119 is made preferably by an $I^2C$-type databus. Communication between the second circuits 119 and the server 400 is made preferably by the Ethernet protocol. The use of Ethernet enables the transfer of data over large distances. The use of Ethernet also enables the use of Power over Ethernet (PoE). PoE enables to supply with electricity, a piece of equipment connected to the network via the Ethernet cable. PoE thus enables to supply with electricity, the sensors 110 without having to install sockets and transformers for these.

Communication of data by the second circuits 119 requires a processing from the microcontrollers 112, which can limit the frequency of the locating system 100 to 270 Hz, while the sensor sensing frequency is 500 Hz.

In the event where no mobile element 200 is detected by the sensor 110, the microcontroller 112 corresponding to said sensor 110 decreases the frequency to which it sends information to the server 400, in order to avoid the server 400 processing useless information.

The sensors 110 are preferably positioned high up in relation to the mobile elements 200, on fastening means. The sensors 110 are preferably positioned at a height of 3 to 10 m in relation to the floor. For example, the sensors 110 can be positioned at a height of around 6 m in relation to the floor.

The sensors 110 are preferably positioned on fastening means which are themselves positioning according to limitations due to the environment wherein the locating system 100 is implemented. These limitations can be due to a beam structure, to the form of a ceiling, to the form of a pre-existing framework or implemented for the locating system 100.

The sensors 110 are preferably positioned so that the capture cones 121 of all the sensors 110 of the locating system 100 cover a volume, and thus a surface on the floor, wherein it is desired to locate the mobile elements 200. The sensors 110 do not need to be aligned. This represents an advantage of the locating system 100 according to the invention, as an alignment of the sensors 110 is sometimes difficult, in particular because of limitations due to the environment wherein the locating system 100 is implemented.

The locating system 100 preferably comprises from 1 to 10000 sensors 110. The locating system 100 more preferably comprises from 100 to 1000 sensors 110.

Figure 9:
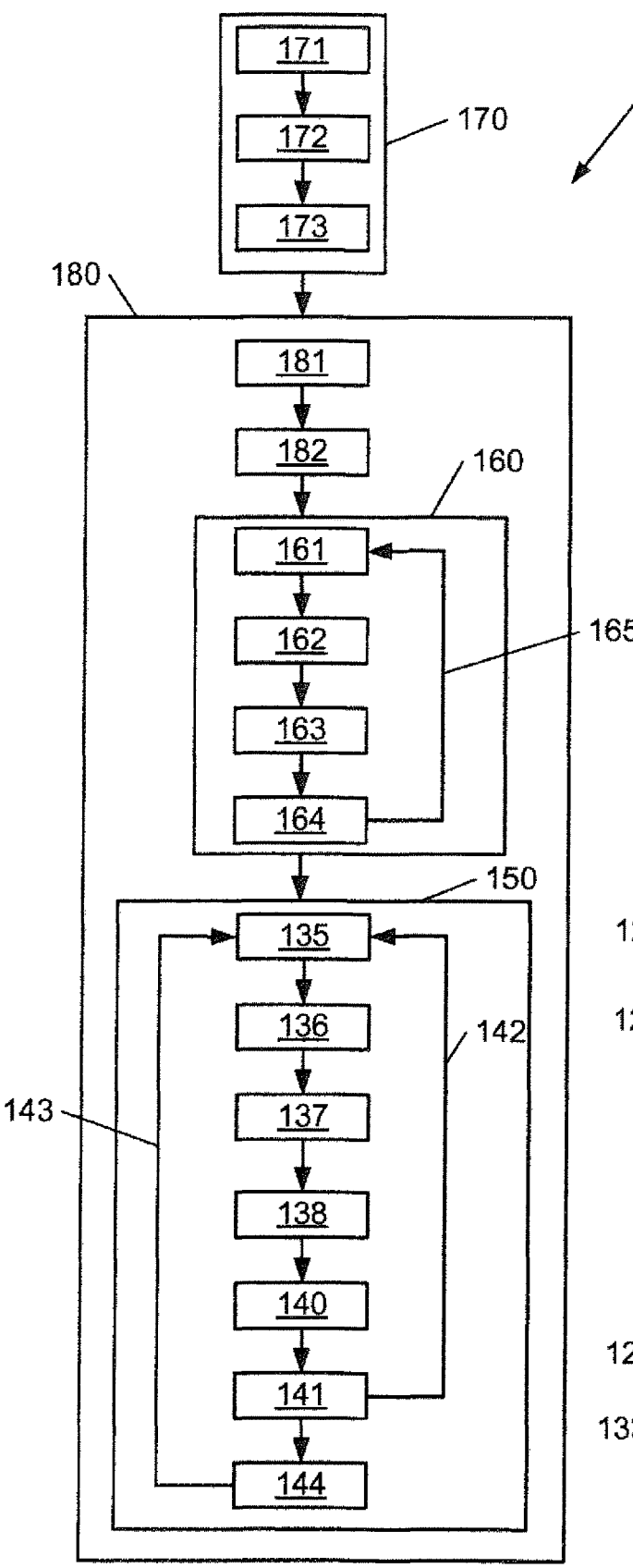
FIG. 9 illustrates a diagram of an installation of the locating system according to the present invention.

FIG. 9 schematises an installation 198 of the locating system 100 according to the present invention. The installation 198 of the locating system comprises a positioning 170 of the locating system 100 equipment and a calibration 180 of the locating system 100.

The positioning 170 of locating system 100 equipment preferably comprises a positioning 171 of the first electronic circuits, a positioning 172 of the second electronic circuits connected to the first electronic circuits and a positioning 173 of the Ethernet cables. The I$^2$C cables and/or Ethernet cables can be replaced by another communication means, like a wireless communication means.

The positioning 171 of the first electronic circuits, which comprises the positioning of the sensors 110, is done in such a way that the capture surfaces 120 of the sensors are partially covered, so as all the surface wherein it is desired to achieve the locations is covered by all the sensors 110. In other words, there is no non-sensed zone between the different surfaces 120 of the different sensors 110 over the whole surface that is desired to be covered.

The sensors 110 are preferably positioned according to the limitations due to the environment wherein the locating system 100 is implemented. These limitations can be due to a beam structure, to the form of a ceiling, to the form of a pre-existing framework or implementation for the locating system 100.

The sensors 110 are preferably positioned against each other to form a grid which overlaps, such as the sensors 110 detect objects over the whole of the surface whereon it is desired to locate the objects. The sensors 110 do not need to be aligned. This represents an advantage of the locating system 300 according to the invention, as an alignment of the sensors 110 is sometimes difficult to achieve, in particular because of the limitations due to the environment, wherein the locating system 100 is implemented.

The calibration 180 of the locating system comprises a determination 181 of the position of sensors, during which the server 400 determines, based on prior information, as that supplied, for example, by the sensor identification system 118, an approximate location for each one of the sensors 110.

Figure 10:
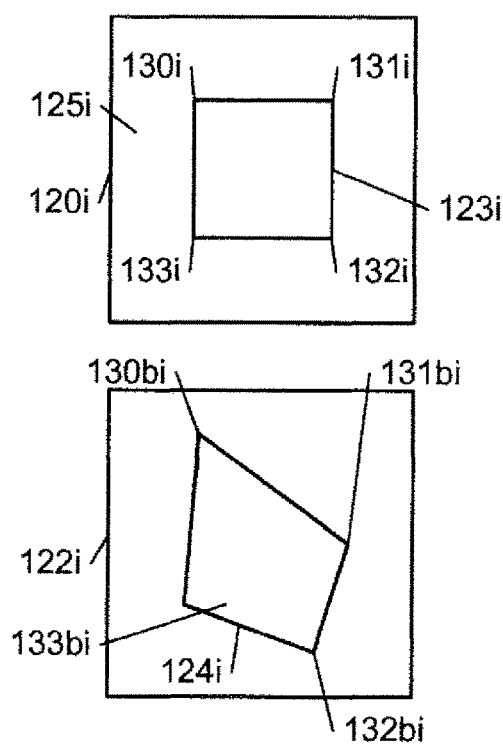
FIG. 10 illustrates a capture surface of the sensor and a sensor matrix.

Then, during a determination 182 of the surfaces to cover, the server 400 determines, the surface 123$i$ to cover to each sensor 110$i$ where i is a whole number or higher than 1 (see FIG. 10). The surfaces 123$i$ to cover are preferably determined so that the surface 123$i$ to cover of a given sensor 110$i$ is comprised in the capture surface 120$i$ of the sensor 110$i$ and so that the surfaces 123$i$ to cover of sensors 110$i$ which is continued in the sensor grid are adjacent. Therefore, there are zones covered by more than one sensor 110$i$. The surfaces 123$i$ to cover are preferably quadrilaterals, more preferably rectangles of around 4 m×2.5 m. During this determination 182 of the surfaces to cover, the server 400 preferably determine an approximate central point for each surface 123$i$ to cover and four points of corners 130$i$, 131$i$, 132$i$, 133$i$ of the surface 123$i$ to cover (see FIG. 10).

The calibration 180 of the locating system then comprises a positional adjustment 160 of the sensors and a calibration 150.

The positional adjustment 160 of the sensors preferably comprises a loop on the sensors 110. Let the iteration of this loop for the i$^{th}$ sensor 110$i$ be considered. By sending 161 central point information, the server 400 indicates to the projection system 300 that the projection system 300 must project an adjusted image indicating in which position the sensor 110$i$ adjusts. For example, the projection system 300 projects a point, in other words, an adjusted image, to the point corresponding to the central point of the surface 123$i$ to be covered by the sensor 110$i$. The projection system 300 projects a point to the point corresponding to the central point of the surface 123$i$ to be covered by the sensor 110$i$ during a central point projection 162. A portable infrared emitter is then positioned on the projection of the central point during a central point positioning 163. The positioning 163 can be done manually or be done by a robot follower, comprising the portable infrared emitter, which follows guidelines projected by the projection system 300. An adjustment 164 of orientation of the sensor 110$i$ is then done manually or automatically. The adjustment 160 loop then passes 165 to a following sensor, preferably near the sensor 110$i$.

The calibration 150 preferably comprises a loop on the sensors 110. Let the iteration of this loop for the i$^{th}$ sensor 110$i$ be considered. An internal loop then considers each corner of the surface 123$i$ to cover. By sending 135 first corner information, the server 400 indicates to the projection system 300 that the projection system 300 must project a marker to the point corresponding to the first corner 130$i$ of the surface 123$i$ to be covered by the sensor 110$i$. The projection system 300 projects a marker to the point corresponding to the first corner 130$i$ of the surface 123$i$ to be covered by the sensor 110$i$ during a first corner projection 136, or to another specific location of the surface 123$i$ to cover. A portable infrared emitter is then positioned on the projection of the first corner during a first corner positioning 137, or near it. The positioning 137 can be done manually or be done by a robot follower, comprising the portable infrared emitter, which can follow a guiding route projected by the projection system 300 or a route programmed in its memory and known to the server. The positioning 137 can possibly be done using a robot follower which follows an electric wire positioned in the floor.

During a calibration measurement 138, the sensor 110i measures the position of the portable infrared emitter such as it perceives it, in other words, the sensor 110i determines the coordinates of the position of the portable infrared emitter in its matrix 122. During a sending 140 of calibration coordinates, the sensor 110i sends the coordinates of the position of the portable infrared emitter in its matrix 122, for the first corner 130i of its surface 123i to cover to the server 400, that the server 400 receives during a step 141 of receiving calibration coordinates.

After receiving 141 the calibration coordinates, the server 400 indicates to the internal loop to then pass to the following corner 142, until the four corners 130i, 131i, 132i, 133i of the surface 123i to be covered by the sensor 110i have been considered. At the end of the internal loop, the server 400 has received the coordinates, in the matrix 122i of the sensor 110i, of the four corners of the surface 123i to cover by the sensor 110i. During a correspondence step 144, the server 400 compares these coordinates in the matrix 122i to the global coordinates that it had requested to the projection system 300 to project during the four sendings 135 of corner information and thus determines the coefficients enabling to pass from the coordinates in the matrix 122i of the sensor 110i to the global coordinates. These coefficients are different for each sensor 110i.

When the four corners 130i, 131i, 132i, 133i of the surface 123i to be covered by the sensor 110i have been considered, the server 400 indicates to the calibration 150 loop to pass 143 to the following sensor, preferably to a sensor near the one which has just been considered, until all sensors 110i have been calibrated.

In an embodiment of the invention, certain steps of the positional adjustment 160 of the sensors and the calibration 150 are carried out in a different order. For example, each sensor is adjusted for the four corners of its surface 123i are measured. It is also possible to only measure 137 the common corners once between different surfaces 123i to cover in order to improve the precision of location when passing from a mobile element 200 of a surface 123i to cover to another and to save time during the calibration 150.

The global coordinates of the locating system 100 are preferably the same as the global coordinates of the projection system 300.

The fact that it is the projection system 300 which indicates the marker points to calibrate 180 the locating system 100 enables for one of these two systems to not be able to be offset against the other. An offsetting of the two systems 100, 300 would not be felt by users, in particular, by pilots of the mobile elements 200.

However, and even if the positional adjustment 160 of the sensors and the calibration 150 have been defined above as calling upon the projection system 300, a positional adjustment 160 of the sensors and a calibration 150 also enabling the determination of the global coordinate of a point from its coordinates in the matrix 122i of a sensor are possible using another technique, for example, a technique calling upon a differential GPS and/or a laser telemeter.

FIG. 10 illustrates the capture surface 120i of the sensor and the sensor matrix 122i. The capture surface 120i of the sensor 110i, as illustrated in FIG. 2, is a surface in actual space, whereas the sensor matrix 122i is the pixel grid in the locating system 100.

The capture surface 120i of the sensor 110i comprises the surface 123i to be covered by the sensor 110i and a transition surface 125i. The surface 123i to be covered by the sensor is preferably a rectangle that has four corners 130i, 131i, 132i, 133i as defined above, but which could have any form, in particular, a hexagonal form. The transition surface 125i is preferably comprised either in the surface to be covered 123i with another sensor, or outside of the surface whereon locations are desired to be achieved.

In particular, because of the fact that the camera of the sensor 110i still does not have an optical axis perfectly perpendicular to the surface 123i to cover, the surface 123i to cover, if it is rectangular, corresponds on the sensor matrix 122i to any quadrilateral 124i that has four corners 130bi, 131bi, 132bi, 133bi. The calibration 150 makes the points 130i-133i in the global coordinates correspond to the points 130bi-133bi in the coordinates of the sensor matrix 122i.

Figure 11:
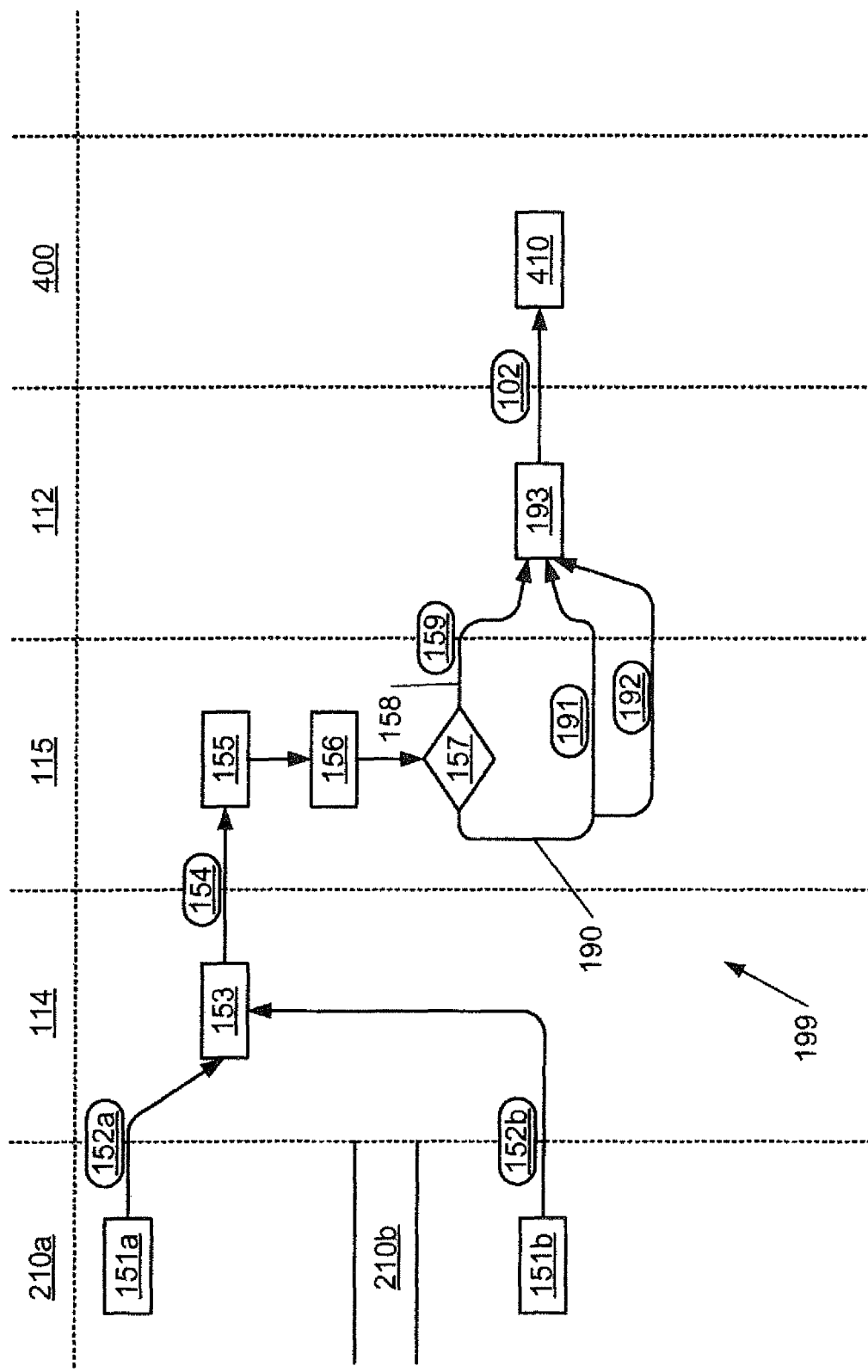
FIG. 11 illustrates a functioning of the locating system according to the present invention.

FIG. 11 schematises a functioning 199 of the locating system 100 according to the present invention, by considering that two emitters 210a, 210b are present in the capture cone 121 of the sensor 110i (not illustrated). A transmission 151a generates an infrared signal 152a for the emitter 210a. A transmission 151b generates an infrared signal 152b for the emitter 210b. The two infrared signals 152a, 152b are detected by the camera 114 during a detection 153. The detection 153 corresponds, for each one of the signals 152a, 153a, to an event on one or several pixels, preferably adjacent, from a sensing matrix of the camera 114. In response, the camera 114 generates an image 154 that has a first resolution, which is equal to the resolution of the sensing matrix 122i (see FIG. 10) and sends this first resolution image 154 to the data processing device 115. The first resolution image 154 preferably comprises a point for both the two infrared signals 152a, 152b as the two infrared signals 152a, 152b merge into one single point.

The data processing device 115 analyses 155 the subpixels to increase the resolution of the image and obtain an image in a second resolution, which is equal to the resolution of the sensor matrix 122 (illustrated by the reference 122i to FIG. 10). The device 115 also determines 156 the coordinates and the sizes of the points corresponding to the two infrared signals 152a, 152b on the sensor matrix 122.

The data processing device 115 checks, during a check 157, if more than four points are present in the second resolution image. If not, 158, the data processing device 115 sends the coordinates and sizes 159 of the points corresponding to all the infrared signals to the microcontroller 112. If so, 190, the points corresponding to the infrared signals are divided into groups of a maximum of four points. During a first sending, the data processing device 115 sends to the microcontroller 112, the coordinates and sizes 191 of the points from a first group of points, and, during a second sending, the data processing device 115 sends to the microcontroller 112, the coordinates and sizes 192 of the points from a second group of points. If there are more than eight points, during a third sending, the data processing device 115 sends to the microcontroller 112, the coordinates and sizes of the points from a third group of points, and so on (not shown).

The sendings are preferably regulated at an identical rate to that of the steps for analysing 155 and determining 156 the coordinates and sizes of the points. If there are four points or less, the rate of sendings for each point is therefore equal to the rate of the steps for analysing 155 and determining 156 the coordinates and sizes of the points. If there are five points or more, the coordinates and size of each point are sent less often to the microcontroller 112.

Therefore, there are no limits to the number of emitters 210 which could be located, but if this number exceeds four, the refreshing of the locating data, in other words, the coordinates and sizes of the points, reaching the microcontroller 112 is of a lower rate. In an embodiment of the invention, the detection 153, analysis 155 and determination 156 are made 500 times a second, which enables that even if the locating data only reaches the microcontroller every other cycle, in other words, 250 times a second, the locating of the emitters remains very precise.

Based on the coordinates and sizes of the points 159 or 191, 192, the microcontroller 112 determines 193 positional information from the sensor 110 with which it communicates and sends positional information 102 from said sensor to the server 400. This sending demands a certain processing time to the microcontroller 122, which means that, if the coordinates and sizes of the points 159 reached the microcontroller 500 times a second, the microcontroller 112 sends positional information 102 to the server around 270 times a second, which corresponds to a cycle frequency of 270 Hz if there are four points or less. If there are five points or more, the frequency is around 135 Hz. The high frequency of the cycle obtained in an embodiment of the present invention enables to obtain a very short latency time for the reaction of the system 800 for creating an environment to the modifications for locating the mobile elements 200.

Based on the positional information 102, and possibly based on other predefined information or adjustments, the server 400 processes the data 410.

Figure 12:
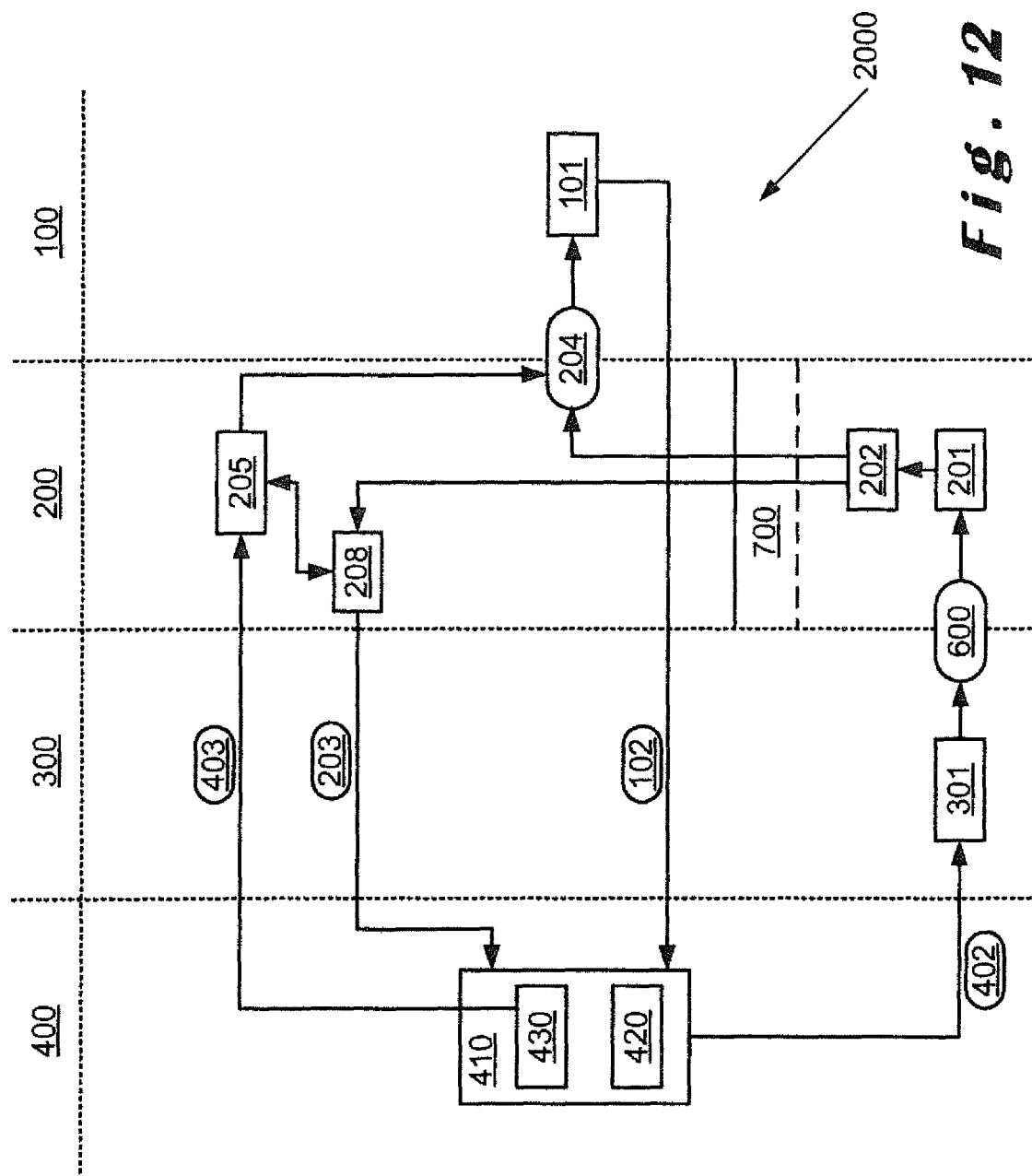
FIG. 12 illustrates a functioning of the system for creating an environment according to an embodiment of the present invention.

The functioning steps 199 which are carried out by the locating system 100 are comprised in determining the position 101 shown in FIG. 12.

FIG. 12 schematises a functioning 2000 of the system for creating an environment 800 according to an embodiment of the present invention.

The server 400 processes the data 410 which results in determining 420 image projection information and determining 420 parametric information. The data processing 410 can be carried out based on an exchange of information with the management device 500 (not illustrated in FIG. 12). The data processing 410 comprises determining 420 projection information and determining 430 characteristic information as defined above.

Based on the determination of 420 image projection information and parametric information, the server 400 sends parametric information 403 to the mobile element 200. Based on the parametric information 403, the mobile element 200 adapts characteristics 205 of the mobile element. The adaptation of characteristics 205 of the mobile element can lead to a positional modification 204 of the mobile element 200.

Based on the determination of 420 image projection information and parametric information, the server 400 sends image projection information 402 to the projection system 300. Based on the image projection information 402, the projection system 300 projects 301 an image which results in at least one image 600. The pilot 700 perceives 201 the image, during which they perceive the information contained in the image 600. Based on the perception 201 of the image 600, the pilot 700 of the mobile element 200 gives instructions 202 to the mobile element 200. The instructions 202 can results in the adaptation 205 of characteristics of the mobile element 200, in information 203 for the server which is sent to the server 400 and/or influence the position 204 of the mobile element 200. The information 203 for the server can be transferred by a transfer step 208, preferably such as defined in FIG. 4.

The position 204 is determined by the locating system 100 during determining the position 101. The locating system 100 then sends positional information 102 to the server 400.

The information 203 for the server and the positional information 102 are then used by the server 400 during processing data 410 in a following cycle. The functioning 2000 therefore involves a cycle.

Other interactions and sendings or exchanges of information between the management device 500, the server 400, the projection system 300, the mobile element 200 and the locating system 100 are possible, not detailed in FIG. 12 in the framework of the invention.

The environment created by the system 800 for creating an environment according to the invention, preferably comprises a set of effect that can be perceived from the mobile element 200 or from another place, in other words, the image 600, the adaptation 205 of the characteristics of the mobile element, in particular by the actuating means 250, and potentially additional effects, like mood lighting.

Methods possibly included in the processing of data 410 carried out by the server 400 are:
- determining global coordinates for the mobile elements 200,
- monitoring the mobile elements 200,
- identifying the mobile elements 200,
- an anti-collision method,
- a guiding method,
- mood lighting and
- displaying images captured by the system 800 for creating an environment.

The server 400 can also manage touchscreens displaying a miniature version of the track and with which observers can interact. They can then add elements on the track in real time, for example.

These methods can be based on the positional information 102 received from all the sensors 110 of the locating system 100 according to the present invention and/or based on the information 203 for the server received from all the mobile elements 200 forming part of the system 800 for creating an environment.

During the determination of global coordinates for the points located by the locating system 100, the server 400 uses positional information 102 which indicates the coordinates and size of a point in the sensor matrix 122 which has detected 153 said point. Preferably, the sensors 110 have previously been calibrated according to the calibration method 180 defined by referring to FIG. 9. The locating system 100 can potentially have been calibrated in another way.

During the determination of global coordinates, the server 400 determines, preferably using the coefficients enabling to pass from the coordinates in the matrix 122 of the sensor 100 to the global coordinates and determined during the calibration 180, the global coordinates of each one of the points detected by the locating system 100.

The global coordinates are used by the monitoring method. The monitoring makes the most recent global coordinates of one point correspond to a point identified previously. The criterion preferably used for this correspondence is the proximity of the most recent global coordinates to the previous global coordinates, if possible, to the global coordinates of the cycle just before. For example, to each iteration of location, the positioning whereon the mobile element is expected to be located to the following iteration is calculated based on the position of the mobile element, its direction, its speed and its acceleration. During the following iteration of the location, a comparison is made between the points received and the points calculated as being those where a mobile element is expected to be located to associate a perceived point with a mobile element. This criterion functions well, because of the high frequency of the locating system 100 and of the precision of the locating system 100, as in the interval between two cycles of the locating system 100, the mobile elements 200 have not had the time to move a lot.

If the monitoring has been able to correspond the most recent global coordinates of a point with a point identified previously, these global coordinates are identified as being those of the mobile element 200 which corresponds to this point identified previously.

If no point in the positional information 102 received from a determined point corresponds to a mobile element 200 which is recorded by the server 400 as being normally locatable by the locating system 100, this mobile element 200 receives the status of "lost from view". The server 400 then sends a message to the mobile element 200, indicating for it to switch off its emitter 210. The server 400 successively sends to each mobile element 200 lost from view, a message requesting that said mobile element 200 switches on its emitter 210.

If the monitoring has not been able to correspond the most recent global coordinates of a point to a point identified previously, and if at least one of the mobile elements 200 is lost from view, the identification attempts to make the connection between the appearance of a point and the switching on of the emitter requested by the server. If this connection exists for a certain time, the global coordinates of the point are identified as being those of the mobile element 200 which had switched on its emitter.

The anti-collision method uses the results from determining global coordinates, monitoring and/or identification. The anti-collision method potentially also uses the coordinates of elements other than mobile elements, like limits of the surface covered by the projection system 300 or the coordinates of other objects. Based on the results of determining global coordinates, monitoring and/or identification, the server 400 calculates the speed (in intensity and direction) and acceleration (in intensity and direction) of the mobile elements 200 and/or the points located. Using Equally Varied Rectilinear Translational Motion formulae, the server 400 then calculates the probabilities of positions of the mobile elements 200 at a future moment. For example, this can be done by calculating the position that the vehicle would be in when it has stopped, if it was forced to brake from the current iteration. This enables collisions to be anticipated between mobile elements or other objects and to determine the intensity of a possible future collision by determining relative speeds at the moment of impact, which are representative of the power of the impact. If the probability that several mobile elements 200 are below a threshold distance is greater than a determined probability, the server 400 sends, in the characteristic information 403, a message to the mobile elements 200 concerned, so that they brake, which means that this braking is automatic, as it is done without human intervention.

The guiding method preferably uses the results from the identification, and can possibly use the results from determining the global coordinates and/or the monitoring. The guiding method also preferably uses information connected to the image 600. For example, in the case of a kart race, the guiding method uses information concerning the global coordinates of the edges of the karting track 911 (FIG. 2).

The guiding method analyses the trajectory of the mobile elements 200 and compares it to a trajectory considered as optimal on the track 911. The guiding method then determines the actions that the pilot 700 must carry out to follow this optimal trajectory. The server 400 sends, in characteristic information 403, a message to the mobile elements 200, so that a message is distributed to the pilot 700. If the message contains audio parts, they are distributed to the pilot 700 by the loudspeaker(s) 259. If the message contains video parts, they are distributed to the pilot 700 by the dashboard. The message can also contain seat vibrations or steering wheel vibrations or a lighting up of one or several buttons of the steering wheel. The audio message can be contained in characteristic information 403 or be present in a memory comprised in the mobile element 200. The audio message can be selected automatically by the server 400 or the board computer 230 in a list of audio messages, or constructed automatically by the server 400 or the board computer 230. The audio message can possibly be distributed in a loudspeaker not forming part of the mobile element 200.

In another embodiment of the invention, the audio message is expressed in real time by a person other than the pilot 700. This can be someone present on the edge of the track 911 who gives instructions guiding the pilot 700 into a microphone connected to the server 400.

The guiding method enables the pilot 700 to receive driving advice in real time.

The guiding method also enables a visually-impaired pilot to be guided. In the case where the invention is used by one or several visually-impaired pilots, the image projection system can be deactivated, even if the environment exists in the memory of the server 400.

The mood lighting method is connected to the use of a mood lighting system, which consists of lighting, for example, LED RGB strips present on a bar near the image 600, and a microcontroller connected to the server 400. The server 400 calculates, according to the lighting information often connected to the context, the colour of the lighting. The lighting information can be a start of a race, the call for an absent player, the use of a special bonus and the theme of the track 911 (track on ice, on dirt, on grass, etc.).

The display of images captured by the system 800 for creating an environment preferably makes the camera 265 present on the mobile element 200. The camera 265 sends images that it captures to the board computer 230, which sends them to the server 400 in the instructional information 203. The server 400 then generates messages leading to the display of these images on a giant screen positioned near the image or on the internet.

In the case of a use of the system 800 for creating an environment for karting, use already illustrated in FIG. 2, the image 600 comprises constant elements, like the track 911, and temporary elements like bonus elements. When a kart 200 drives over a bonus element, which is detected by the system 800 for creating an environment using a correspondence between the projection position of the bonus element and the location of the kart 200 made by the projection system 100, the kart 200 wins the bonus. This gives it an advantage: it wins the possibility to shoot the gun, to go quicker, etc. The different bonuses present in karting, car racing and fighting video games, can thus be experienced by pilots in real karting, as well as other types of bonus.

If the kart 200 comes off the track 911, which is perceived by the server 400 via the locating system 100, the server 400 can determine that a penalty is applied to the kart 200. The server 400 then sends, in the characteristic information 403, a message to the kart 200 with the effect of this penalty. This can be, for example, a stopping of the kart 200 or a limited maximum speed. This can be conveyed through a clamping of acceleration, a braking of one single wheel, a braking of a wheel and an acceleration of the other wheel or a vibration of the kart 200.

The server 400 considers that a first kart 200a succeeds with shooting a second kart 200b when the server 400 calculates that the instruction 202 corresponding to the shot has been made by the pilot of the first kart in a place (determined by the locating system 100) and a moment such as the shot having a determined speed has reached the second kart, this also being located by the locating system 100. The shot is preferably made by the pilot by pushing the shooting button 224. The shot is preferably made visible by a temporary image projected by the projection system 300 and made audible by the pilot of the first kart in its loudspeaker by a shooting sound which is moving away from it and by the pilot of the second kart in its loudspeaker by a shooting sound which is approaching it. In the event of a successful shot, the server 400 indicates to the second kart 200b (FIG. 1), in the characteristic information 403 (FIG. 12) intended for the second kart 200b, that its maximum power is decreased, which has the effect of decreasing its maximum speed, and also indicates a message to display on the dashboard. The server 400 also indicates to the first kart 200a, in the characteristic information 403 intended for the first kart 200a, that its shot has succeeded.

Another effect made possible by the system 800 for creating an environment according to the invention, is the possibility for a first kart 200a to benefit from a vacuum effect by a second kart 200b. If the first kart is positioned behind the second kart, which is detected by the server via the location of the two karts by the locating system 100, its maximum speed is increased by the server 400, via characteristic information 403, to simulate that its air resistance is decreased, like in a car race vacuum effect.

Another effect made possible by the system 800 for creating an environment according to the invention is the possibility to compensate for the lack of performance of a vehicle (for example, due to wear and tear of a mechanical element or the excessive weight of a pilot) by analysing the speed of the kart compared with the requested acceleration and by applying a coefficient to the accelerator.

Another effect made possible by the system 800 for creating an environment according to the invention, is the possibility to create a correction factor so as to balance the race by helping players who are behind and by penalising players who are leading the race.

Another effect made possible by the system 800 for creating an environment according to the invention, is a game with a "painting" mode, wherein pilots "paint" the floor with their kart, in other words, that a trail of a colour specific to each kart appears in the image 600 behind the kart and remains on the image 600. The aim of the game is to paint a maximum amount of surface with the colour given to the player's kart. In the painting mode, video stream computers 303 are informed, by the server 400, of the position 204 and of the colour of each kart. For each kart located in its projection cone 611, based on its position 204 and on its colour, the video stream computer 303 determines the painting zones of this colour appearing in its partial image 610. The video stream computer 303 continuously traces a very thick line between the previous position of a kart and its new position. The video stream computer 303 determines, in real time, the number of pixels covered by the different paint (on their respective projection surface, of course). They return to the server a table, continuously, which details the number of pixels counted for each paint and which enables it to calculate the scores. The projection computer is then able to identify the different traces of paints and total them up (in pixels). It simply returns the result of each iteration to the server, which will take note of it, to process the scores.

The server 400 can insert a temporary sand image on a section of the track 911 by giving its instruction to the projection system 300 via projection information 402. If a kart 200 drives over the sand image, which is determined by the locating system 100, it receives a penalty.

Using the system 800 for creating an environment according to the invention, karting can be fun when driving alone and a race between different pilots can be impacted by the effects of projecting the image 600 or the kart's actuating means 250 effects, like shooting.

A pilot can have a level, like in video games, which gradually increases as they play. A successful shot on a pilot of a higher level can win a higher bonus that a successful shot on a pilot of a lower level.

In an embodiment of the invention, the server 400, which is aware of the position of the mobile elements 200 using the locating system 100, adapts the image 600 projected by the projection system, so that nothing is projected on the mobile elements 200 or that, on the contrary, a halo of a certain colour is projected on the mobile elements 200.

Possible uses other than karting for the system 800 for creating an environment are as follows:

skiing, in particular, indoor skiing: location of a emitter on skiers' equipment, projection of images on the ski slope, with a mobile element formed by the skier and the skier's equipment biking, in particular, indoor biking: location of a emitter on bikes or cyclists' helmets, projection of an image of the bike track or images on a bike track, with a mobile element formed by the bike, the cyclist and their equipment remote-controlled car circuit: location of a emitter on cars, the pilot of a car being physically outside of the car, even if it is defined here as forming part of the mobile element, projection of a car track "laser game": location of a emitter on players' equipment, mobile element comprising the player and their equipment, of which their gun and its shooting sensors, projection of elements like bonuses or targets in components constituting a game maze location of objects or robots in a factory: robots or objects to be located having a emitter, there is preferably not a projection system and pilot in this use location of objects on sports fields/pitches/courts, etc.: for example, location of a ping-pong ball reflecting infrared and lit up with infrared radiation in an environment (table and floor, in particular) which does not reflect by infrared In these uses, as in other uses, a part of the system 800 for creating an environment can be used independently from the rest of the system 800 for creating an environment. For example:

only the locating system 100 is used, potentially coupled with the server 400, only the projection system 300 is used, potentially coupled with the server 400, only the mobile element 200 is used, potentially coupled with the server 400, the locating system 100 and the projection system 300 are used, potentially coupled with the server 400, the locating system 100 and the mobile element 200 are used, potentially coupled with the server 400, or the projection system 300 and the mobile element 200 are used, potentially coupled with the server 400.

In each one of these cases, one or several of the methods defined in the framework of the invention, can be implemented.

The following preferable elements enable a reliable location, precise almost to the cm, at a frequency of more than 200 Hz, of dozens of mobile elements over a surface of more than 100 m²:
- a set of sensors 110 according to the present invention,
- the connection of the sensors 110 by I²C to the microcontrollers 112,
- the connection of the microcontrollers 112 by Ethernet to the server 400, and
- the calibration 180 of the locating system according to the present invention.

Such a precision and such a frequency of location enable the mobile elements to be moved at a speed of 30 km/h in the environment created by the system for creating an environment by having this environment, which comprises the kart, from the images projected potentially of other elements, which is adapted to their precise position. This also enables collisions to be avoided between mobile elements and enables the pilot to be guided by the guiding method according to their precise location.

The system 800 for creating an environment, by preferably integrating the projection system 300, the locating system 100 and one or several mobile elements 200, enable the pilot and spectators to be immersed in an environment combining tangible elements, like mobile elements, and images and where tangible elements and images interact. The combination of the following preferable elements enables the pilot and/or the spectators to be immersed in the environment created by the system 800 for creating an environment;
- the image 600, containing constant elements and temporary elements, these temporary elements depending on the location of the mobile elements,
- the effects created by the actuating means 250, and
- mood lighting.

The system 800 for creating an environment according to the invention can be moved, light, quick to implement (potentially in one day). It is really comfortable, easy to use, ensures a high level of safety, and provides the pilot and the spectators with the sensation of having a full, complete experience.

The locating system 100 according to the invention can also be moved, light, quick to implement, really comfortable and easy to use.

The projection system 300 according to the invention can also be moved, light, quick to implement, really comfortable and easy to use.

The system 800 for creating an environment according to the invention combines the advantages of actual karting, like actual acceleration, and video game karting like bonuses, interactions with the environment and makes players have a level of experience.

The invention claimed is:

1. System for creating an environment, the environment comprising at least one image configured to be perceptible by at least one pilot of at least one mobile element, the system comprising:
   at least one mobile element that comprises an electronic interface, and at least one actuating means that is connected to the electronic interface and configured to carry out a modification of characteristics of said mobile element based on a signal received from the electronic interface;
   a projection system configured to project at least one image on at least one floor;
   a locating system configured to determine a position of each of the at least one mobile element that is present and near to the at least one image, and
   a server configured to be connected to the electronic interface of each of the at least one mobile element and to the locating system, the server being configured to control said at least one actuating means based on the position of each mobile element received from the locating system, wherein the server is configured to be connected to the projection system and to control the projection system based on the determined positions of each of the at least one mobile element that are received from the locating system,
   wherein each mobile element further comprises an infrared emitter configured to emit an infrared signal enabling the locating system to locate the mobile element;
   wherein the locating system comprises at least one microcontroller connected to the server and at least one sensor connected to the microcontroller;
   wherein each at least one sensor comprises a camera configured to take an image and configured to detect infrared radiation comprising the infrared signal; and
   wherein the sensor further comprises a device for processing data configured to increase the resolution of the image taken by the camera.

2. System according to claim 1, wherein each of the at least one mobile element further comprises at least one actuator that is connected to the electronic interface and configured to be actuated by a pilot of the mobile element, wherein the server is configured to act on the projection system and on the at least one actuating means based on an actuation of the at least one actuator.

3. System according to claim 1, wherein the infrared emitter comprises a light-emitting diode with a power of between 5 and 50 Watts.

4. System according to claim 1, wherein the projection system comprises a plurality of projectors, each one of the projectors being configured to project a partial image such that all the partial images projected by the projectors form the image.

5. System according to claim 4, wherein the projectors are positioned high up and project their partial images towards the at least one floor.

6. System according to claim 1, wherein the at least one sensor is a plurality of sensors, further comprising a system for identifying sensors, wherein. the server, using the system for identifying sensors, is configured to identify a sensor from which information reaches it from among the plurality of sensors.

7. System according to claim 1, wherein each of the at least one sensor is positioned high up in relation to the mobile elements, and on a fastening means.

8. System according to claim 1, wherein each of the at least one sensor is configured to perceive a capture cone which has an intersection with the at least one floor defining a capture surface of the at least one sensor.

9. System according to claim 1, wherein the at least one mobile element is a kart and the image comprises a karting track.

10. System according to claim 1, wherein each of the at least one mobile element comprises a plurality of actuating means which comprise a right engine and a left engine.

11. System according to claim 10, wherein the plurality of actuating means comprises a rear screen.

12. System according to claim 1, wherein each of the at least one mobile element, comprises:
- a board computer;
- a dashboard:
- an emitter;
- a plurality of pilot actuators;
- a plurality of actuating means;
- a seat;
- a power means; and
- four wheels.

13. System according to claim 12, wherein the power means is a battery.

* * * * *